(12) United States Patent
Venter et al.

(10) Patent No.: US 12,062,098 B2
(45) Date of Patent: Aug. 13, 2024

(54) SYSTEMS AND METHODS FOR DETECTING AND MITIGATING CYBER SECURITY THREATS

(71) Applicant: COMPUTED FUTURES INC, Driftwood, TX (US)

(72) Inventors: Frederick Venter, Driftwood, TX (US); Jayendra Pathak, Austin, TX (US)

(73) Assignee: COMPUTED FUTURES INC, Driftwood, TX (US)

( * ) Notice: Subject to any disclaimer, the term of this patent is extended or adjusted under 35 U.S.C. 154(b) by 277 days.

(21) Appl. No.: 17/533,416

(22) Filed: Nov. 23, 2021

(65) Prior Publication Data

US 2022/0164892 A1 May 26, 2022

Related U.S. Application Data

(60) Provisional application No. 63/217,281, filed on Jul. 1, 2021, provisional application No. 63/117,429, filed on Nov. 23, 2020.

(51) Int. Cl.
*G06Q 40/08* (2012.01)
*H04L 9/40* (2022.01)

(52) U.S. Cl.
CPC ......... *G06Q 40/08* (2013.01); *H04L 63/1408* (2013.01); *H04L 63/1433* (2013.01)

(58) Field of Classification Search
CPC .. G06Q 40/08; H04L 63/1408; H04L 63/1433
See application file for complete search history.

(56) References Cited

U.S. PATENT DOCUMENTS

| | | | |
|---|---|---|---|
| 10,497,250 B1* | 12/2019 | Hayward | G06N 3/088 |
| 10,824,634 B2* | 11/2020 | Siebel | G06N 5/01 |
| 11,743,271 B2* | 8/2023 | Venter | G06N 5/025 726/22 |
| 2020/0348662 A1* | 11/2020 | Cella | G05B 19/41865 |
| 2021/0006574 A1* | 1/2021 | Venter | H04L 63/20 |
| 2021/0075803 A1* | 3/2021 | Venter | G06F 11/3006 |

* cited by examiner

*Primary Examiner* — Kristie D Shingles

(57) ABSTRACT

A method for protecting computing assets includes detecting a set of events in a networked computing environment using a set of event sensors distributed in the networked computing environment, determining a risk factor by applying the set of events to a detection model using an inference server in communication with the set of event sensors, and communicating the risk factor to an insurance server from the inference server.

20 Claims, 20 Drawing Sheets

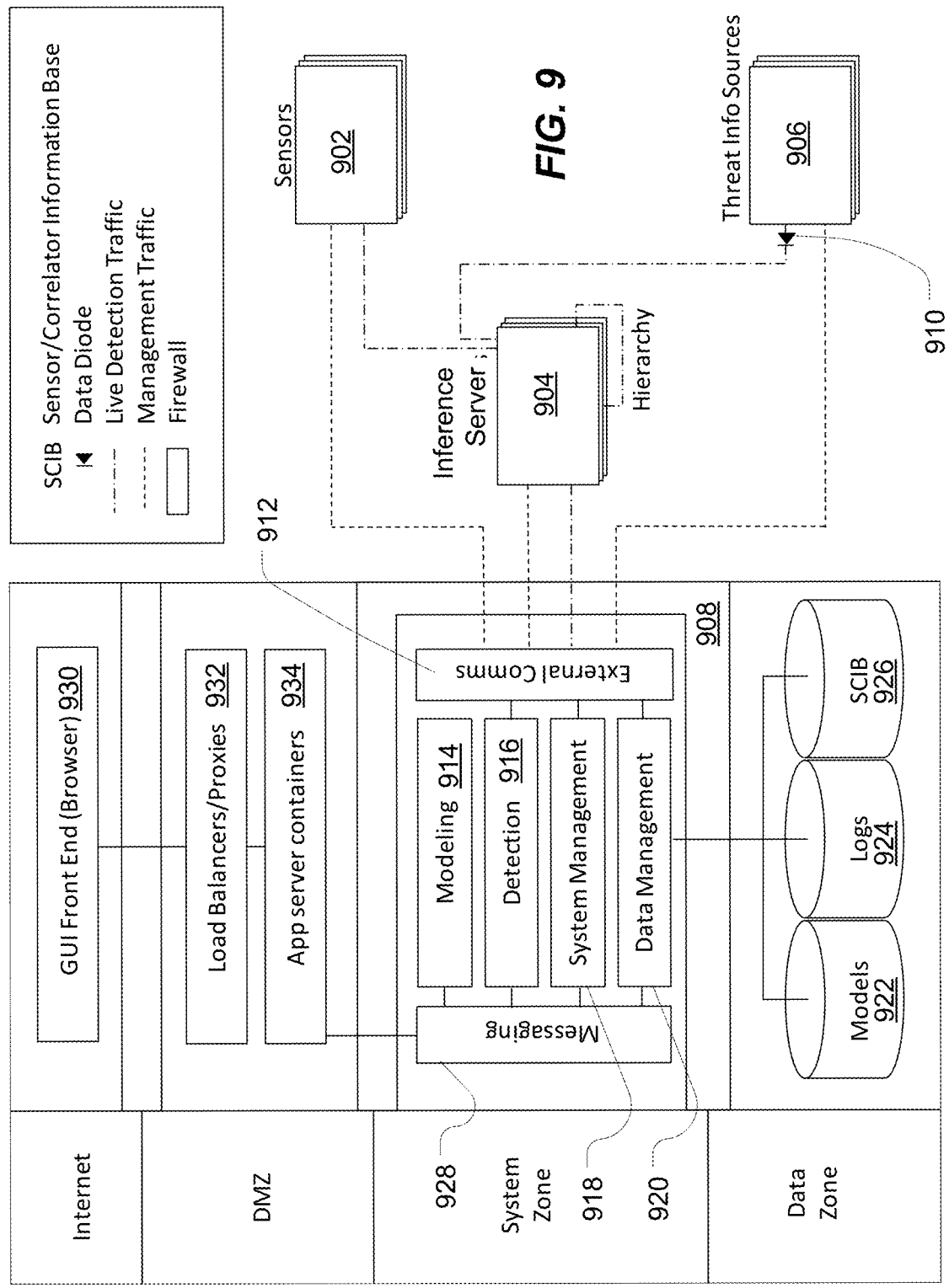

| PCS \| EVENTS \| MODELS | |
|---|---|
| ATTRIBUTE_FEEDER_VM_23 → ENDPOINTPROCESSES – 41343d1d-e6db-4619-87ca-bd125280022bc | |
| SENSOR FEATURES DETECTED | REACHED NODE |
| FILENAMEHASEXE | _C1 |
| FILENAMEHASEXE,PARENTFILENAMEHASEXE | _C2 |
| FILENAMEHASEXE,PARENTFILENAMEHASEXE, FILEPATHLIKETEMP | _C46 |
| FILENAMEHASEXE,PARENTFILENAMEHASEXE, FILEPATHLIKETEMP,PARENT FILEPATHLIKETEMP | _C81 |
| FILENAMEHASEXE,PARENTFILENAMEHASEXE, FILEPATHLIKETEMP, PARENT FILEPATHLIKETEMP,SCRIPTCAPTUREFILE | _C74 |
| FILENAMEHASEXE,PARENTFILENAMEHASEXE, FILEPATHLIKETEMP, PARENT FILEPATHLIKETEMP,SCRIPTCAPTUREFILE,NOTWHITELISTED | _C71 |
| FILENAMEHASEXE,PARENTFILENAMEHASEXE, FILEPATHLIKETEMP, PARENT FILEPATHLIKETEMP,SCRIPTCAPTUREFILE,NOTWHITELISTED,UNVERIFIED | _C69 |
| SHOW STEPS ON DIAGRAM | |

| PCS | EVENTS | MODELS | | |
|---|---|---|---|---|
| ATTACK PROGRESS | | MODEL | SESSION ORIGINATOR | SESSION ID |
| 0 | | ENDPOINTPROCESSES | ATTRIBUTE_FEEDER_VM_1 | 47b46e7d-bcf3-49c6-afba-97a990c4f2b5 |
| 0.7142857142857143 | | ENDPOINTPROCESSES | ATTRIBUTE_FEEDER_VM_10 | 30aac1b5-e283-438e-9d32-8a7b1db1b61c |
| 0 | | ENDPOINTPROCESSES | ATTRIBUTE_FEEDER_VM_12 | 18b682f-91a2-4b49-9e27-75a1c58f7a58 |
| 1 | | ENDPOINTPROCESSES | ATTRIBUTE_FEEDER_VM_23 | 41343d1d-e6db-4619-87ca-bd125280 22bc |

SYSTEMS AND METHODS FOR DETECTING AND MITIGATING CYBER SECURITY THREATS

CROSS-REFERENCE TO RELATED APPLICATION(S)

This application claims benefit of U.S. Provisional Application No. 63/117,429, filed 23 Nov. 2020, and claims benefit of U.S. Provisional Application No. 63/217,281, filed Jul. 1, 2021, each of which is incorporated herein by reference in its entirety.

BACKGROUND

Many data-driven processes are vulnerable to threats, fraud, or other malfeasance. One such example is networked computer systems.

Increasingly, consumers are relying on the Internet for shopping and entertainment. Similarly, businesses are relying ever more on computerized networks for commerce, supply chain management, interactions with consumers, and storing consumer information and behaviors. As such, a considerable amount of valuable information, such as consumer information, including credit card numbers and personal information, or commercial information, including market research, transaction information, and other sensitive business information, is stored on networked devices.

Such valuable information is tempting for thieves and hackers. In recent years, the personal information of billions of users has been stolen from company databases. Such information can include credit card numbers that are sold on the black market or other sensitive personal information, including medical records or purchasing histories. Given the value of the information stored on various computing assets, hackers have become increasingly sophisticated, overcoming conventional cyber security measures.

Leaks and successful attacks represent significant risks for business. Exposure of sensitive customer information could cost a business millions of dollars resulting from class action lawsuits and government fines. As such, business are looking to mitigate risk through security measures and insure against potential losses.

BRIEF DESCRIPTION OF THE DRAWINGS

The present disclosure may be better understood, and its numerous features and advantages made apparent to those skilled in the art by referencing the accompanying drawings.

FIG. 9 includes an illustration of an example monitoring or management system for a cyber security system.

FIG. 22 includes an illustration of an example progress interface.

FIG. 23 includes an illustration of an example threat monitoring interface.

The use of the same reference symbols in different drawings indicates similar or identical items.

DETAILED DESCRIPTION

In embodiments, systems and methods for cyber security, including technologies, processes, and practices designed to protect networks, devices, programs, or data from attack, damage, or unauthorized access, are disclosed. In addition, such systems and methods can be used to assess the risk of a financial loss resulting from a breach in security. In a particular example, factors indicative of the risk of loss can be used in determining insurance premiums.

In an example, such cyber security can include network security, device security, database security, fraud detection, and combinations thereof. In a particular example, such cyber security includes network security. In another example, such cyber security includes device security. Such systems and methods find particular use in computing environments, such as computer networks, individual servers, database servers, or combinations thereof.

In an embodiment, a system includes a sensor in communication with a data source. The sensor can communicate detected attributes to an inference server. The attributes can be derived from network traffic, transactions, data inquiries, machine behavior, data, or any combination thereof, among others. The inference server can collect sets of attributes associated with an actor and apply the sets of attributes to a model, for example, including nodes correlating with the set of attributes. The inference server can communicate the output of the model, for example, the identified nodes, to a monitoring server. The monitoring or management server can utilize the outputs from one or more inference servers to monitor activity within the data source and associated system. In particular, such a monitoring server can monitor a system for security breaches, fraud, or other malfeasance. In an additional example, the system can include a risk forwarder to provide risk factors and alerts to external management and insurance systems.

In additional examples, the system can be used to monitor fraud in a banking system or insurance system, breaches in cyber security, terrorist activity, user behavior, filesystem activities, process management, recommendation systems, buyer predictions, among others, or any combination thereof.

Figure 1:
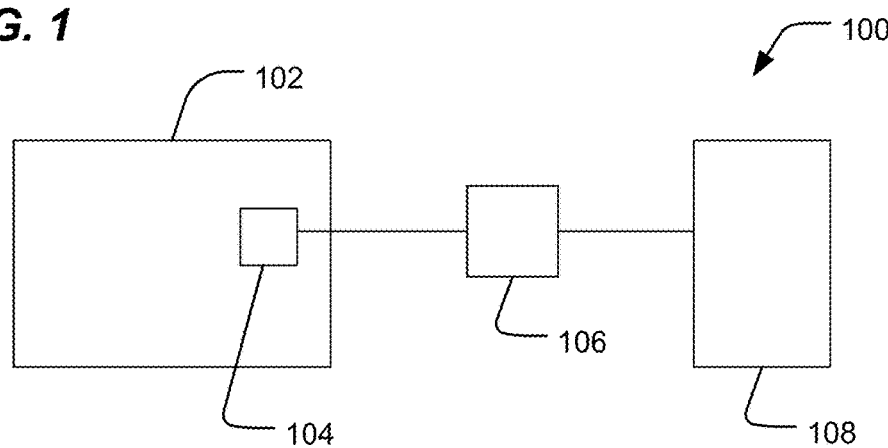
FIG. 1 includes an illustration of an example system.

In an example, FIG. 1 illustrates a system 100 in communication with a data source 102. The system 100 includes a sensor 104 monitoring attributes of data associated with the data source 102. Depending upon the nature of the data source 102 the attributes can relate to transactions, network traffic, processor operations, filesystem changes, other data associated with the data source 102, or any combination thereof, among others. When attributes are detected, the sensor 104 provides those attributes to an inference server 106. When communicating the attributes, the sensor 104 can associate the attribute with, for example, a user, a source of the data, a network address, a transaction identifier, or any combination thereof, among others. The inference server 104 can collect sets of attributes associated with an actor or contributor and compare such sets of attributes to a model. Based on the output of the model, the inference server 106 can provide information to a monitoring system 108. The monitoring system 108 can alert a system user, act to prevent damage to the system, or escalate monitoring of activities associated with the actor or contributor.

While a single sensor 104 is illustrated, the inference server 106 can be in communication with one or more sensors. The monitoring system 108 can be in communication with one or more inference servers. As such, the monitoring system 108 can follow, for example, user behavior, across multiple devices, following multiple attributes associated with the user behavior.

In an example, the inference server includes a model derived, for example, using Sequence Learning. Sequence Learning can include Deep Learning, such as a Recurrent Neural Network (RNN) or natural language learning. In another example, Sequence Learning can include the use of Markov models, such as a Markov chain or hierarchical Markov models. In a further example, Sequence Learning includes the use of Association Rule Learning, such as symbolic rule learning. Examples of Associative Rule Learning include Frequent Item Sets, Formal Concept Analysis (FCA), or other concept analysis techniques, such as Triadic Concept Analysis or Fuzzy Concept Analysis, among others.

Figure 2:
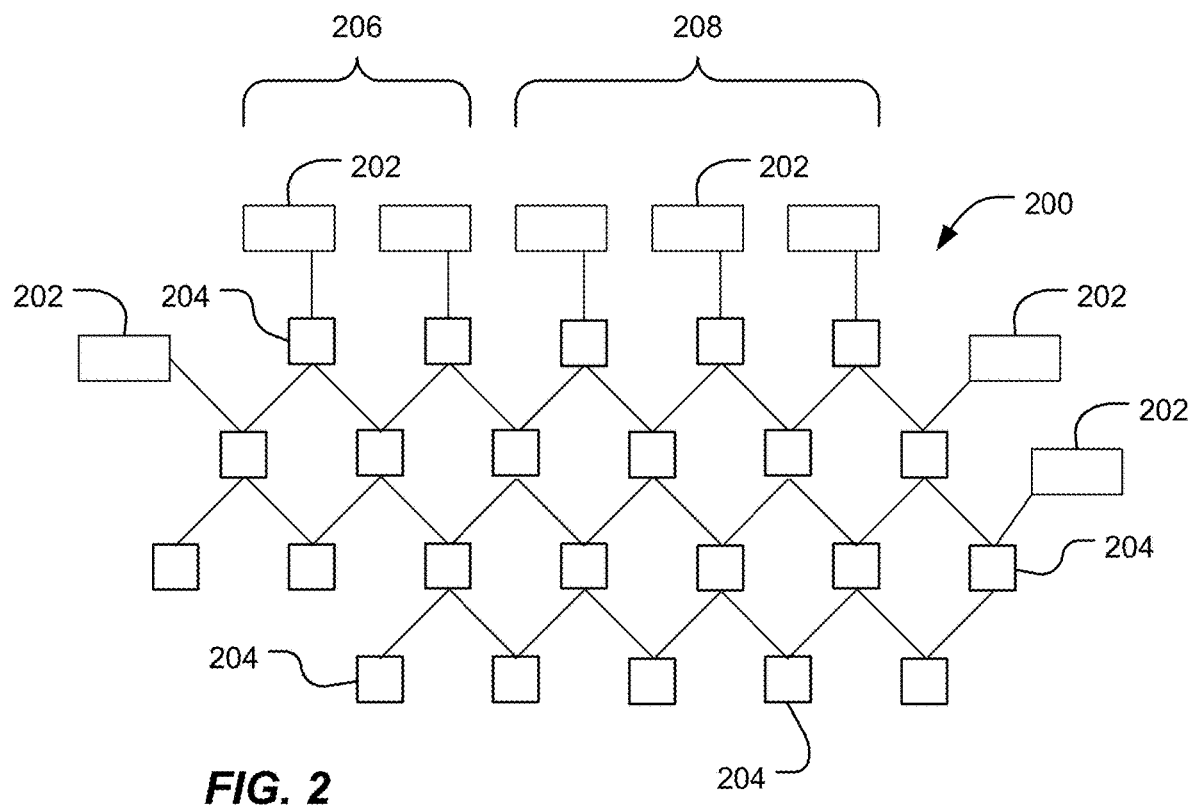
FIG. 2 includes an illustration of an example lattice for use in the system.

In some examples, the model is derived using Formal Concept Analysis and using the attributes being monitored by the one or more sensors. FIG. 2 illustrates an example Formal Concept Analysis lattice 200. Attributes 202 are connected to nodes 204. Nodes 204 can be connected to other nodes 204, providing an attribute lattice in which a node represents a set of attributes linked to it through the lattice. A node is reached by being the highest node (node closest to the top level) linked to the identified attributes. Many of the nodes 204 may represent harmless activity within a system, while other nodes may represent harmful activities or represent proximity to or a path to a harmful activity.

In a system that utilizes multiple sensors and optionally multiple inference servers, a set of attributes 206 can be monitored by a sensor and an inference server. A second set of attributes 208 can be monitored by different sensors or different inference servers. As such, different aspects of the lattice can be assigned for monitoring by different inference servers. Some nodes of the lattice can act as attributes to be applied as inputs into lattices associated with other inference servers.

In an embodiment of a cyber security system, the system includes a plurality of events sensors in communication with a plurality of inference servers. The inference servers are in communication with a cyber security server and optionally, with other inference servers. The event sensors detect sets of events occurring within network traffic or implemented on network devices. These sets of events (i.e., attributes) are compared to an event lattice to identify behavior patterns associated with actors initiating the network traffic or commands and optionally, the monitored resource from which the event was identified.

Actors access the computing assets either from within a protected network or through a wide area or global network outside of the protected network. An identifier of an actor associated with a behavior pattern identified by the inference server to be risky to the protected computing assets is communicated to the cyber security server or optionally, to other inference servers. In an example, the system can provide a prediction of next events, provide a risk assessment, or alert a user of the security system to the possibility of harm to the computing assets. Optionally, the system can provide risk factors and alerts to external insurance systems. In a further example, the system can mitigate harm to the computing assets, either through user action or automatically, to block actors exhibiting behaviors indicative of an attack on the computing assets, reverse the state of a machine, or take other measures to protect the computing assets. While an originator can be an actor accessing the computing assets, in other examples, the originator can be a monitored resource implementing a process, such as a virus or worm, designed to harm or infiltrate the computing environment. As such, an event can associate an attribute with an originator, such as an actor, a monitored resource, or both.

In a further embodiment, a method for establishing a cyber security system includes receiving annotated event data, portions of which include events indicative of an attack on computing assets. The method can further include generating an event lattice that includes one or more patterns indicative of an attack on the computing assets. The event lattice can, for example, be formed using Sequence Learning. In an example, the event lattice can be formed using Formal Concept Analysis (FCA). In another example, a Markov chain can be used to predict next events associated with the behavior pattern or provide a risk assessment associated with the behavior pattern as it develops.

Sets of events within the event lattice can be associated with event sensors. Portions of the event lattice can be assigned to inference servers in communication with sets of event sensors configured to detect events associated with the assigned portion of the event lattice. The event sensors and inference servers can be deployed across the protected computing assets and implemented on various networked equipment, devices, and assets. The inference servers can be configured to communicate to a cyber security server or optionally, other inference servers. In a particular example, the event lattice can be reconfigured as new examples of attacks are identified.

In a further embodiment, a method for protecting computing assets in a computing environment, such as a computer network, includes detecting, using event sensors, a first set of events associated with an originator or attribute originator. The first set of events are compared to an event lattice or portion thereof by an inference server in communication with the first set of event sensors. The inference server can detect a behavior pattern associated with or indicative of an attack on the computing assets and can provide the identity of the originator or optionally an assessment of the risk. In an example, the inference server communicates an identifier of the originator, a risk assessment associated with the detected behavior pattern, or other information about the behavior pattern to a management or monitoring server, such as a cyber security server, which can provide notification to a user of the security system. In an additional example, risk factors or risk alerts associated with the detected behavior pattern can be communicated to an external insurance system.

In another example, the inference server can provide such information to another inference server monitoring a different portion of the event lattice using a different set of event sensors. For example, a second set of event sensors can detect events associated with the originator. The second inference server can utilize the second set of events along with an alert from the first inference server to further detect behavior patterns associated with the originator. The second inference server can provide additional risk assessment information or other information about the behavior of the originator to the cyber security server or other inference servers. The cyber security server can mitigate risk to the computing asset, either automatically or through user intervention, by reversing the state of a virtual machine, blocking further traffic to or from an originator, or taking other actions to protect the computing asset.

Figure 3:
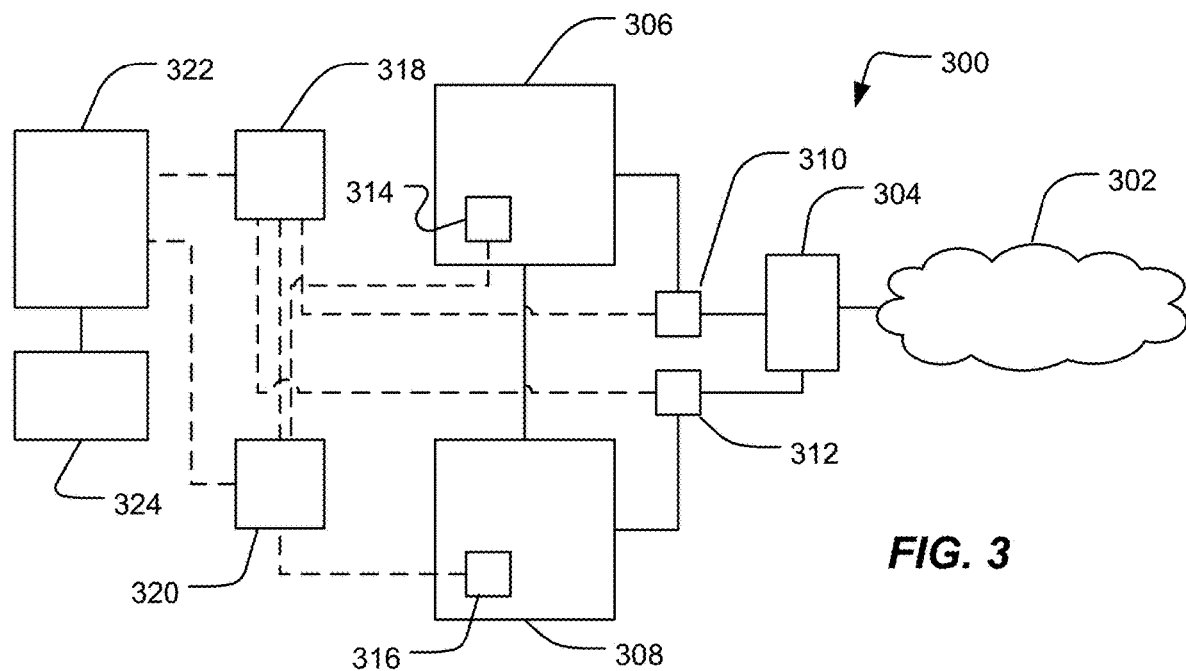
FIG. 3 includes an illustration of an example cyber security system.

FIG. 3 illustrates an example protected set of computing assets 300.

Originators of network traffic can utilize a wide area or global network 302, such as the Internet, to access computing assets through a firewall 304. Example computing assets 306 and 308 can respond to requests and instructions and otherwise interact with originators through the network 302 and firewall 304. Event sensors 310 or 312 can monitor network traffic, and event sensors 314 or 316 can monitor actions taken at the devices 306 and 308. In an example, events detected by event sensors 310 and 312 are provided to an inference server 318. Events occurring on devices 306 or 308 and detected by event sensors 314 or 316 can be provided to an inference server 320. The inference servers 318 or 320 can work together to monitor sets of events associated with an originator and detect behavior patterns indicative of an attack on the computing assets. The inference servers 318 or 320 can communicate an identifier associated with an originator, a risk assessment of behaviors associated with that originator, and other behavior or event information to a management or monitoring server, such as cyber security server 322. The cyber security server 322 can implement a user interface 324 that permits real-time monitoring of risks within the computing assets.

Event sensors can be configured to monitor various network packets, behaviors, actions taken at devices, access to devices and associated applications, and other events occurring within the computing assets in response to communications to and from an originator. In an example, event sensors can detect patterns in network packets. An event sensor can, for example, search for a signature within a network packet. In another example, an event sensor can be configured to monitor file change patterns, disk usage patterns, memory usage patterns, central processing unit (CPU) usage patterns, process tables, call graphs, user behavior, application access, or combinations thereof. For example, some event sensors, such as event sensors 310 and 312, can monitor network packets, searching for signatures associated with specific events. Other event sensors, such as event sensors 314 or 316, can monitor file change patterns or application access associated with a specific device or computing asset.

While any one event associated with an originator may not be indicative of an attack on computing assets in the computing environment, such as a network, a set of events can match a behavior pattern that, as the behavior pattern develops, indicates greater risk to the computing assets. The event sensors provide sets of events to inference servers. The inference server can monitor a portion of an event lattice associated with the events that the event sensors are configured to detect. The inference servers, such as inference servers 318 and 320, monitor the sets of events identified by the event sensors and compare the sets of events to an event lattice to detect behavior patterns associated with an originator of the network traffic.

In an example, each inference server monitors a portion of an event lattice that includes events detectable by the event sensors in communication with the inference server. For example, the inference server 318 can monitor behavior within the event lattice associated with the events found when the event sensors 310 or 312 search for signatures within network packets. A portion of an event lattice associated with events surrounding computing asset performance and behavior can be utilized by an inference server 320 in communication with the event sensors 314 and 316. In a particular example, the inference server 318, through comparison of a set of events associated with an originator to a first portion of an event lattice, can identify behavior associated with the originator and can alert the inference server 320 to monitor activity by the originator to further identify and categorize or assess risk associated with developing behavior patterns of the originator.

The monitoring of network traffic and computing asset behaviors can be communicated from the inference servers 318 and 320 to the cyber security server 322. The inference servers can be implemented on various computing devices and assets. For example, the inference servers can be implemented in firewalls, bridges, routers, switches, access points, servers, dedicated devices, or combinations thereof. Inference servers can be implemented in software or hardware designs. In an example, the inference server can be implemented in a hypervisor or at a protected virtual machine located in proximity to the event sensors assigned to the inference server.

The monitoring or management server, such as cyber security server 322, can include modules for monitoring or modeling an event lattice, user behaviors indicative of risks to the computing assets, probabilities of risk to the computing assets, or combinations thereof. In addition, the system can include a module for detecting risk to the computing assets and for communicating with inference servers in communication with event sensors. Further, the cyber security server 322 can implement a user interface allowing real-time monitoring of risk to the computing assets.

Figure 4:
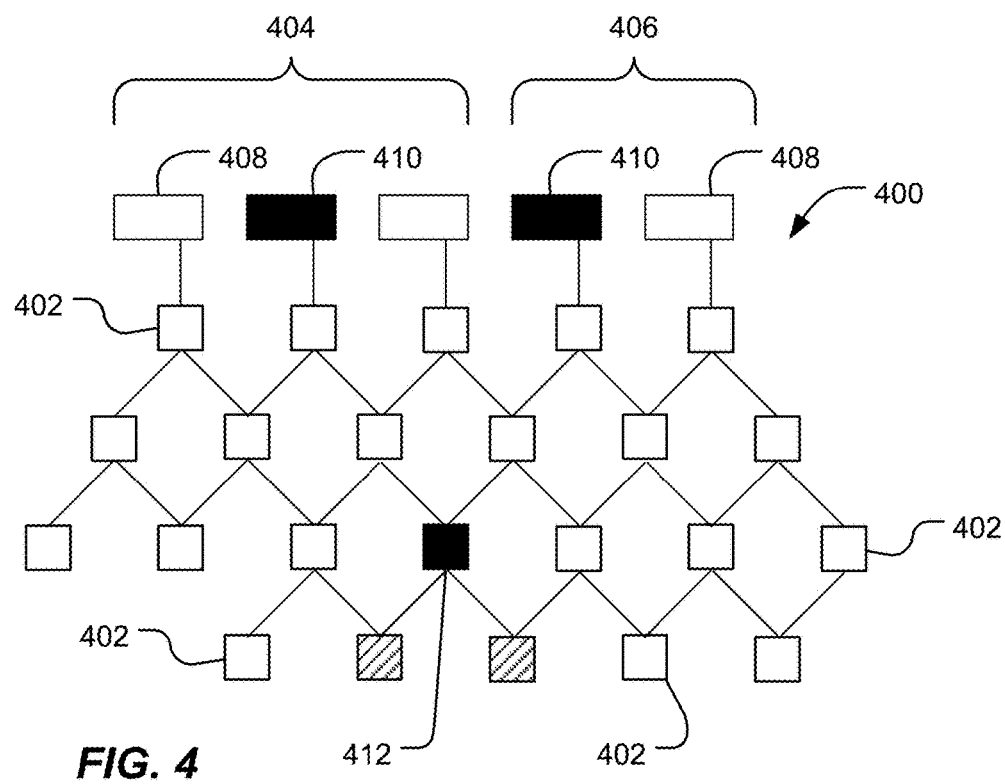
FIG. 4 and FIG. 5 include illustrations of example event lattices for use in a cyber security system.

FIG. 4 illustrates an example event lattice 400. The event lattice 400 includes a list of events or attributes 408/410 assigned to nodes 402. The nodes 402 are associated with sets of events occurring within the network or on computing assets. An event node 402 can represent the intersection of two or more detected events or attributes 408/410. For example, an event node 402 can represent the occurrence of both a detected signature in a network packet and an event occurring on a computing asset, such as an application access or a file change.

The event lattice 400 can represent collections of events associated with user behavior when accessing the computing assets. In a particular example, events in one region of the event lattice 400 may be typical of an originator initiating access to the computing assets. Events in another portion of the lattice may be indicative of the originator accessing applications or data implemented on a computing asset, such as a server. While many patterns within the event lattice 400 can represent limited risk to the computing assets, one or more patterns, such as patterns leading to node 412 illustrated as a solid square, can represent a high risk to the computing assets. As events associated with an originator are detected, patterns of originator behavior become clear, and when such patterns are indicative of risk to the computing assets, a risk level associated with that originator can be elevated.

In an example, the event lattice 400 can be divided into portions, such as portions 404 and 406, based on the events being detected. Such portions 404 or 406 can be utilized by different inference servers implemented within the computing assets. For example, a portion of the event lattice associated with events tied to detecting network packets can be assigned to inference servers implemented in firewalls, routers, switches, access points, or other computing equipment. In another example, portions of the event lattice associated with implementation of applications and virtual machines can be associated with inference servers implemented in a hypervisor or virtual machines in proximity to associated event sensors. Portions of an event lattice associated with events occurring on computing asset in a public facing portion of a network can be monitored by an inference server implemented at the public facing portion of the network, whereas portions of the event lattice associated with events occurring on computing assets in a private portion of the network can be monitored by inference servers implemented within computing assets within the private portion of the network. In other examples, the lattice may track attributes associated with a monitored resource.

Figure 5:
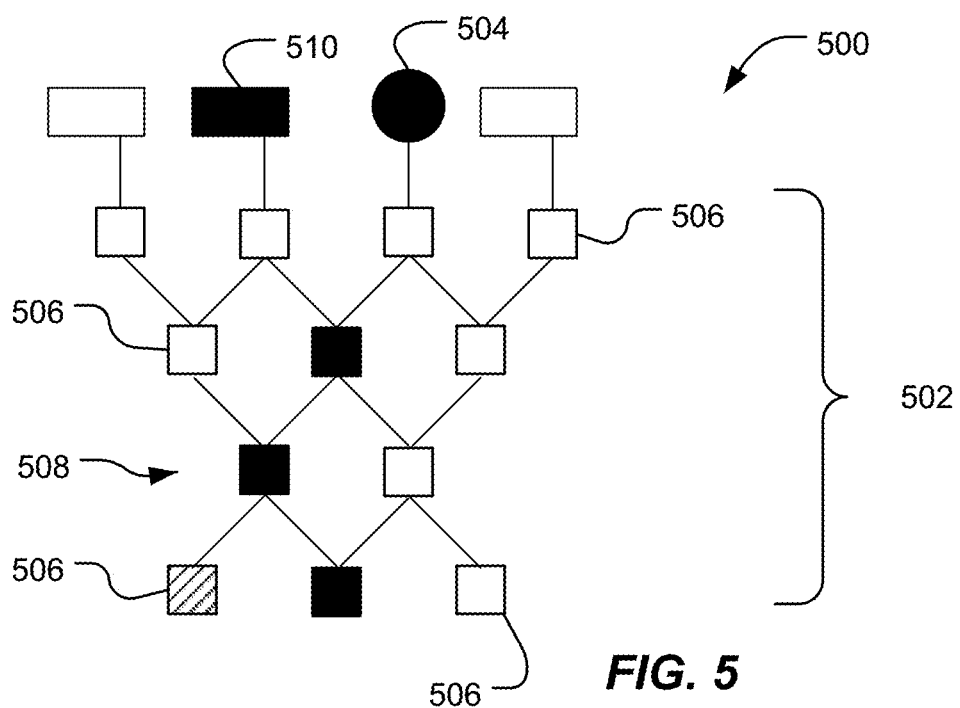

The inference servers can communicate identified patterns of behavior and associated originators to a cyber security server or to other inference servers. For example, a portion 502 of the event lattice 500 is illustrated in FIG. 5. A behavior pattern 508 can include detection of another portion of the behavior pattern by a different inference server at 504 followed by a further detected event 510. In the illustrated example, a node from one inference server can act as an event or attribute for a portion of the event lattice utilized by a different inference server. When the behavior pattern is indicative of risk to the computing assets, the inference server can notify a cyber security server or can communicate with a further inference server to track additional events associated with the originator of the behavior. In an example, risk associated with predicted future events or a risk level associated with a detected behavior pattern can be determined based on the node associated with the set of events. For example, a percentage of harmful nodes following a node in the behavior pattern 508 can be indicative of risk. In another example, a distance to a node (e.g., number of further events or leaps to further nodes) that represent harm to the computing assets can be used to assess risk. In such a manner, monitoring of the behavior is distributed among various assets within the computing assets implementing different inference servers monitoring different portions of the event lattice, providing greater robustness and fast execution.

Figure 6:
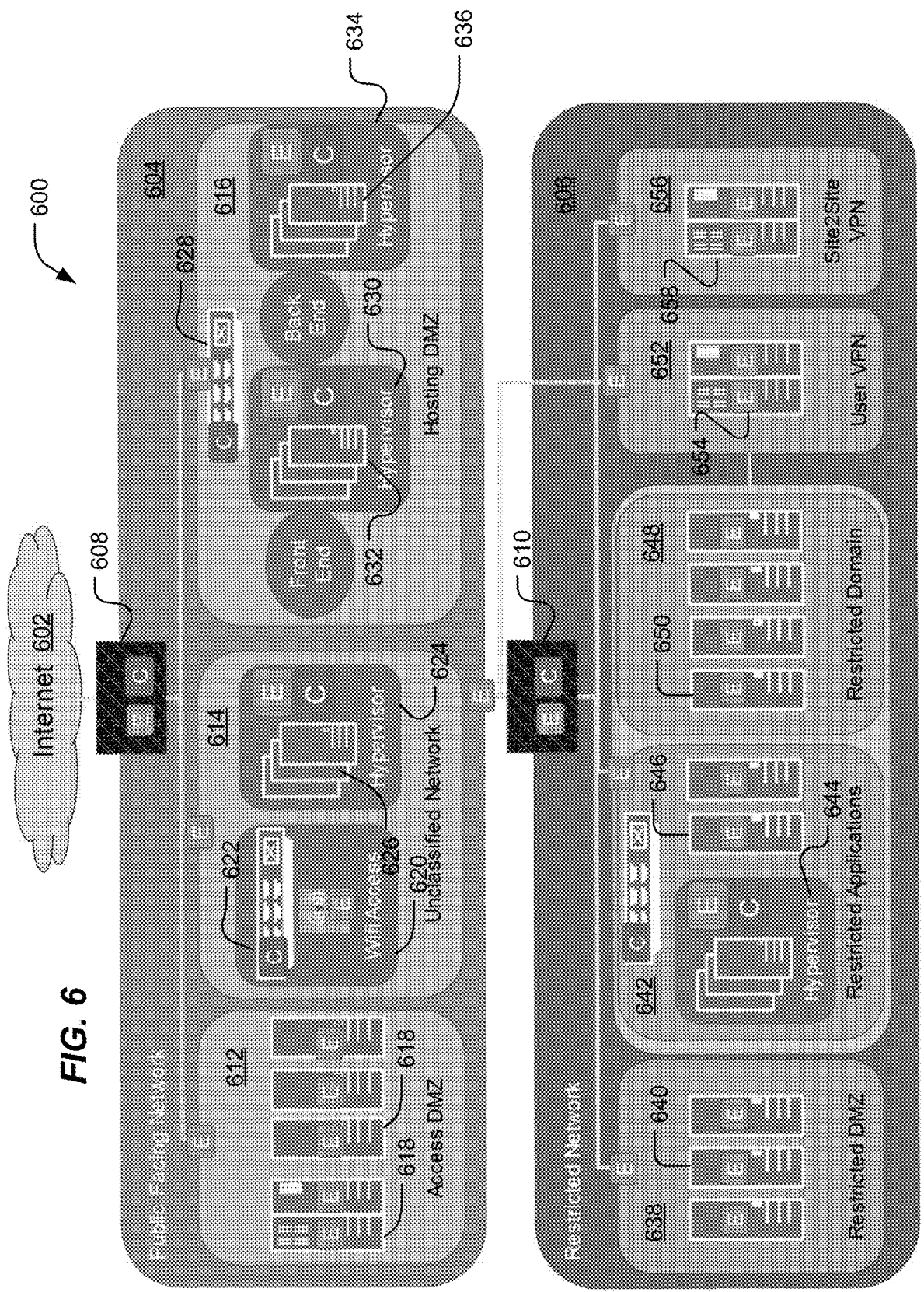
FIG. 6 includes an illustration of an example set of computing assets including a cyber security system.

FIG. 6 illustrates a computing environment, such as protected computing assets 600. The computing assets 600 can be accessed through a wide area network or global network, such as the Internet 602. Traffic enters the network 600 through a firewall 608 into a public facing computing assets 604. Another firewall 610 can separate restricted computing assets 606 from the public facing computing assets 604.

In an example, the public facing computing assets 604 include DMZs (demilitarized zones). For example, the public facing computing assets 604 can include an Access DMZ 612 and associated computing assets 618. In another example, the public facing computing assets 604 can include a Hosting DMZ 616. The Hosting DMZ 616 can include equipment 628, such as a load balancer, router, or switch. In addition, the Hosting DMZ 616 can include front end computing assets 632, such as assets controlled by a hypervisor 630 and can include backend computing assets 634 controlled using a hypervisor 636. Further, the public facing computing assets 604 can include other computing assets 614, such as wireless access point 620 in communication with equipment 622, such as a router or switch. Additional computing assets 626 can be controlled by a hypervisor 624.

The restricted computing assets 606 can include a Restricted DMZ 638 and associated computing assets 640. The restricted computing assets 606 can also include virtual private networks (VPN), such as a user VPN 652 and associated computing devices 654 and a Site-to-Site VPN 656 and associated computing assets 658. The restricted computing assets 606 can also include restricted applications 642 or a restricted domain 648. The restricted applications 642 can includes network equipment 660, such as a firewall, a router, an access point, a switch, a bridge, a load balancer, or any combination thereof, and can be controlled by hypervisor 644 actively implemented with computing assets 646 or other equipment. Similarly, the restricted domain 648 can be implemented using computing assets 650.

Event sensors [E] can be implemented in various positions within the computing assets 600. In an example, event sensors [E] can be implemented as separate devices attached to the network. In another example, the event sensors [E] can be implemented within network equipment, a computing asset, or a virtual machine. In other examples, event sensors [E] can be implemented within network equipment, such as routers, firewalls, switches, bridges, access points, or any combination thereof.

Similarly, inference servers [C] can be implemented within network equipment and computing assets and can be positioned in proximity to the event sensors [E] assigned to a particular inference server [C]. In an example, an inference server [C] can be implemented within network equipment, such as a firewall, a router, an access point, a switch, a bridge, a load balancer, or any combination thereof. In another example, an inference server [C] can be implemented within a computing asset, such as a server, hypervisor, a virtual machine, or any combination thereof.

In particular, an event lattice can be subdivided into portions that are assigned to various inference servers distributed throughout the computing assets 600. Each inference server can observe events in search of behavior patterns indicative of an attack on the computing assets. Moreover, the inference servers can provide indications to other inference servers to spur further observation of behavior and identify risk as behavior patterns develop.

For example, an inference server [C] 702 (see FIG. 7) can be implemented in a firewall 608 along with an associated event sensor [E] 720. In another example, an inference server 704 can be implemented in equipment 622 and can access event sensors 722 and 724. In a further example, an inference server 710 can be implemented in a hypervisor 624 and can communicate with event sensors 730 implemented on computing assets 618 or an event sensor implemented within the hypervisor 626. In a further example, an inference server 712 can be implemented within a front-end hypervisor 630 to communicate with an event sensor 734 also implemented within the hypervisor 630. In another example, an inference server 714 and an associated event sensor 736 can be implemented within the backend hypervisor 634.

In a further example, the inference server 716 and associated event sensors 738 and 740 can be implemented within a firewall 610 monitoring traffic between public facing computing assets 604 and the restricted computing assets 606. Further, an inference server 718 can be implemented in network equipment monitoring network traffic within the restricted computing assets using event sensors 742. Additionally, an inference server 719 can monitor event sensors 744 distributed among computing assets 640, 650, 654, or 658 or an event sensor 746 implemented within the hypervisor 644.

Figure 7:
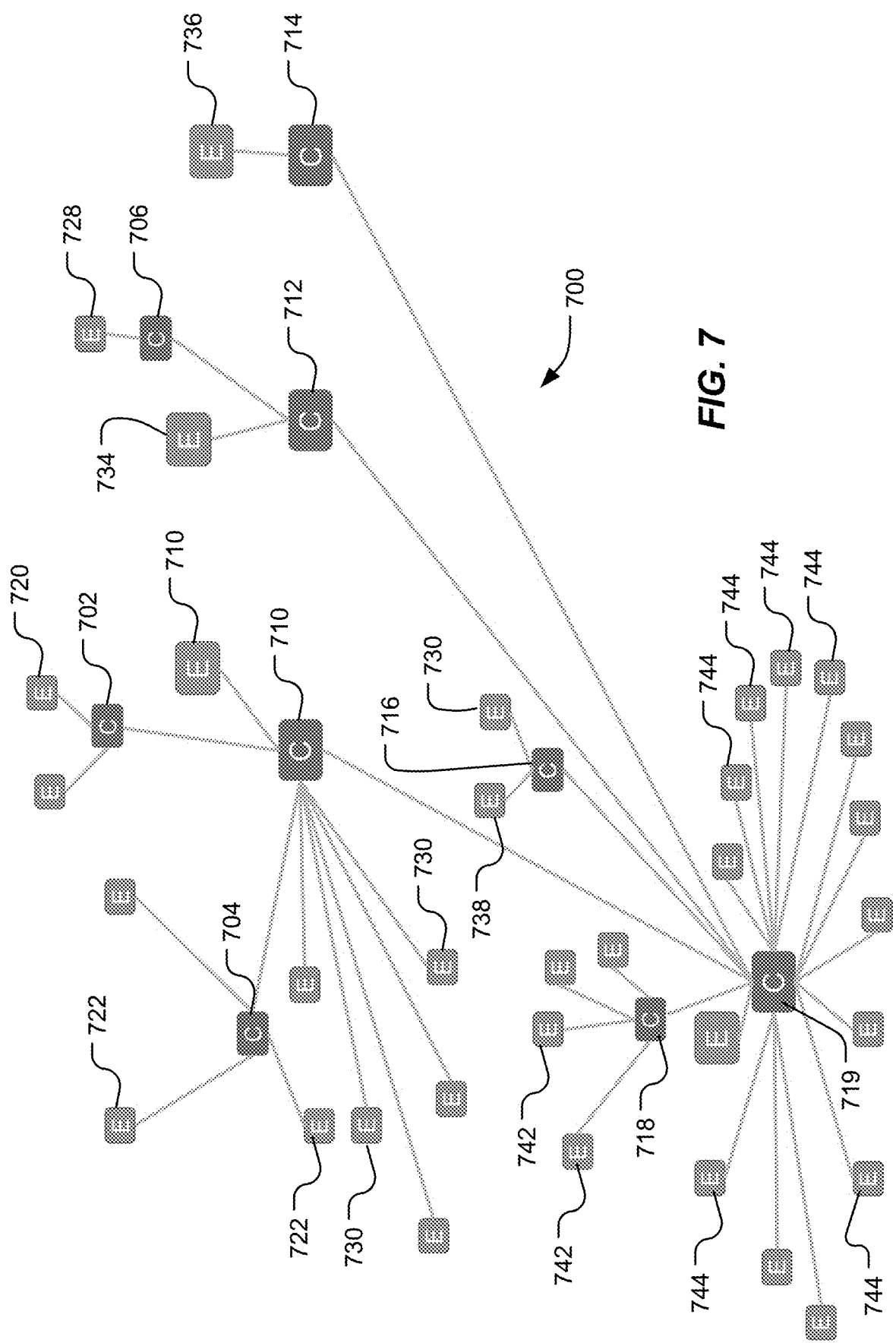
FIG. 7 includes an illustration of an example communication structure within the cyber security system of the example computing assets of FIG. 6.

FIG. 7 illustrates the interconnection between the inference servers, their associated event sensors, and other inference servers. In particular, an inference server 702 or 704 can detect behavior patterns associated with a particular session ID, originator network address, or another identifier associated with the originator. The identified behavior pattern can be communicated to a further inference server 710 that can detect further events associated with the originator's behavior and identify additional risks associated with the behavior pattern of the originator. Similarly, patterns can be discovered using an inference server 706 that triggers the inference server 712 to monitor behaviors of an originator. In another example, an inference server 714 can detect behaviors using events from event sensor 736 that are indicative of an attack. The inference servers 710, 712 and 714 can communicate with a further inference server 719, along with inference servers 716 and 718 and can detect additional network traffic indicative of a risk to the computing assets. The inference server 719 can be triggered by one or more additional inference servers and further observe the behavior associated with a particular session ID to additionally assess risk associated with the behaviors of an originator of the network traffic.

While some attacks on the computing assets may originate from external networks, other attacks may originate from internal sources or through conventionally trusted access points, such as virtual private network (VPN) access points. Employees and other conventionally trusted users may maliciously attack the computing assets. Alternatively, computing devices, such as laptops or tablets, of such employees may become infected with malicious software as a result of using a tainted portable drive or succumbing to phishing attacks or social engineering. In either case, the illustrated cyber security system can detect and address attacks on the computing environment whether from external sources or internal sources.

Figure 8:
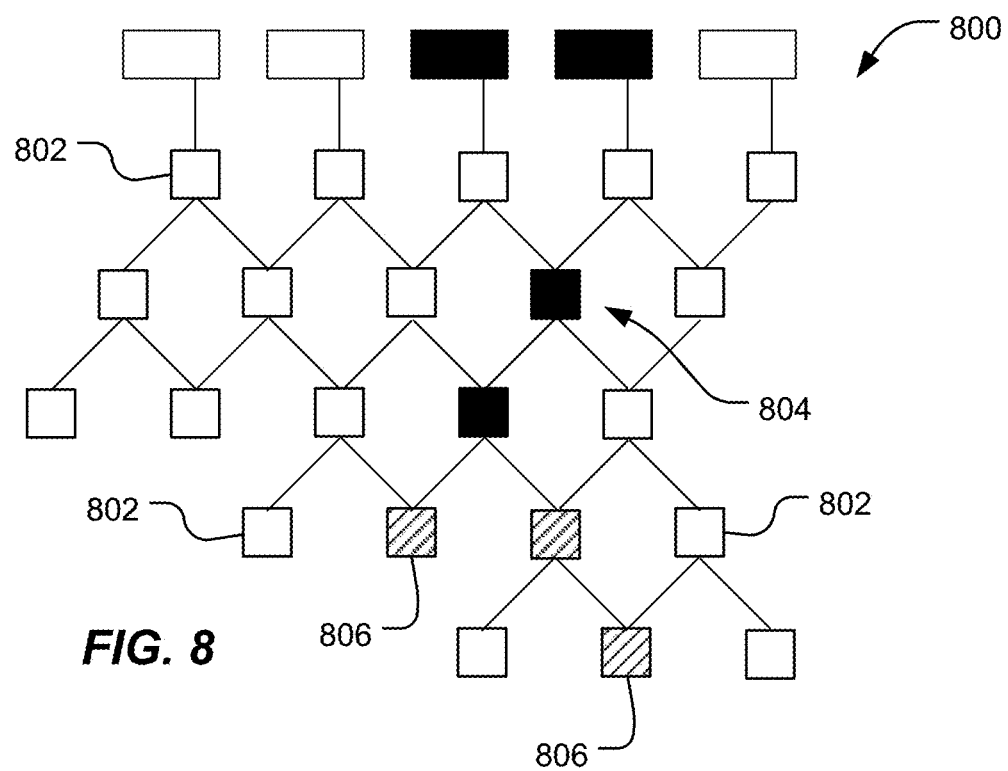
FIG. 8 includes an illustration of an exemplary event lattice for use in a cyber security system.

FIG. 8 illustrates a further event lattice including nodes 802. As events are detected, a pattern 804 emerges from the set of detected events. The system can then predict or provide a likelihood or probability that a subsequent harmful event 806 will occur. In an example, probabilities associated with predicted future events or a risk level associated with a detected behavior pattern can be determined based on the node associated with the set of events. For example, a percentage of harmful nodes following the pattern 804 can be indicative of risk. In another example, a distance to a node 806 (e.g., number of further events or leaps to further nodes) that represent harm to the computing assets can be used to assess risk. As inference servers continue to monitor events associated with a session, a behavior pattern emerges that provides a more definitive assessment of risk to the computing assets.

The inference servers can communicate risk to a management or monitoring server, such as a cyber security server, including, for example, an identifier associated with an originator of a behavior pattern, the nature of the behavior pattern, probability of a subsequent event, or associated risk level. As illustrated in FIG. 9, the behaviors and risks identified by the inference servers are provided to a cyber security system 900. For example, sensors 902 can provide events to the inference servers 904, and threat information sources 906 can provide information to the inference servers 904. The inference servers 904 can communicate with each other in accordance with the inference server hierarchy, or the inference servers 904 can communicate with a cyber security server 908. In addition, the server 908 can communicate or provide instructions, commands, or configuration data to the sensors 902, the inference servers 904, and the threat information sources 906. Desirably, threat information sources 908 can be separated or isolated from the inference servers using an information or data diode 910. The system can include an external communications module 912 and can implement control signals and receive information from the inference servers.

The cyber security server 908 can include a detection module 916 to utilize behavior information identified by the inference servers 904 to identify threats. The detection module 908 can follow the behavior patterns identified by each of the inference servers, associate risk with developing patterns, and can predict a likelihood that a behavior pattern associated with an originator or attribute originator is adverse to cyber security. In particular, the detection module 916 maintains an overview of the various risks identified by each of the inference servers 904. While each of the inference servers 904 has a view of a portion of the event lattice and can identify patterns of interest, the detection module 916 can follow the identified patterns within the whole event lattice and provide an overview of risk to users of the security system 900.

In addition, the system can include a system management module 918 that communicates via the external communications module 914 with the sensors 902, inference servers 904, and threat information sources 906. The system management module 918 can further provide interfaces to users, provide notifications to users, and interact with users and other modules to facilitate system management.

A data management module 920 can collect data from various modules 914-918 or the inference servers 904 and store the data within various databases, such as the model database 922, a log database 924, and a sensor/inference server information base (SCIB) 926. In an example, an event lattice or a Markov model can be stored within the model database 922. A log database 924 can be used to store logs of detected events, identified behavior patterns, identities of originators, system update logs, other logs, or combinations thereof. The sensor/inference server information base (SCIB) 926 can store a sensor and inference server hierarchy, network addresses or access information associated with inference servers and sensors, and other information associated with the function, activity, or distribution of the inference servers and sensors across a computing environment, such as a protected set of computing assets. In an example, portions of the lattice can be assigned to inference servers for monitoring events associated with the event sensors or other inference servers in communication with the inference server. The portions of the lattice assigned to inference servers can be identified and stored within the SCIB 926.

In addition, the cyber security server 908 can include a modeling module 914. For example, the modeling module 914 can access logs or other appropriate information to develop an event lattice or a Markov model. The modeling module 914 can store models within the model database 922, for example, using the data management module 920. Such event lattices can be subdivided and provided to the inference servers. In an example, the portion of the event lattice assigned to an inference server can be recorded in the SCIB 926.

The cyber security server 908 can use a messaging module 928 to communicate with a security system user and provide access for risk assessment activities within the computing assets. In particular, a graphical user interface or front-end browser 930 can be provided that accesses loads balancers and proxies 932 and associated application server containers 934 to obtain information from the securities server, initiate modeling, define an event sensor and correlator structure, or perform system management.

In an example, a user of the security system can access a modeling module 914 using a user interface 930. A model can be generated, for example, using Formal Concept Analysis to generate an event lattice. The event lattice can be stored in a model database 922 by the data management module 920. The user can configure distribution of event sensors and inference servers, for example, using a systems management module 918. Configuration data, including addresses of the sensors and inference servers, assigned portions of the event lattice, and other configuration data can be stored in the SCIB 926. As inference servers detect behavior patterns, the detection module 916 can monitor activities and risks across the computing assets. The detection module 916 or the systems module 918 can communicate with a user of the security system using the graphical user interface 930.

While FIG. 9 illustrates the security system as being implemented as a unit, alternatively, aspects of the security system can be implemented in separate computing resources. For example, aspects of the system implementing lattices and distributing lattices can be implemented on cloud resources, while aspects of security monitoring and user alerts can be implemented on dedicated servers.

Further, the security system can communicate with an insurance system. For example, inference servers 904 can communicate either directly or indirectly through the security zone modules with the insurance system to provide assessments of risk and risk alerts. In another example, the security system can communicate with the insurance system.

Figure 10:
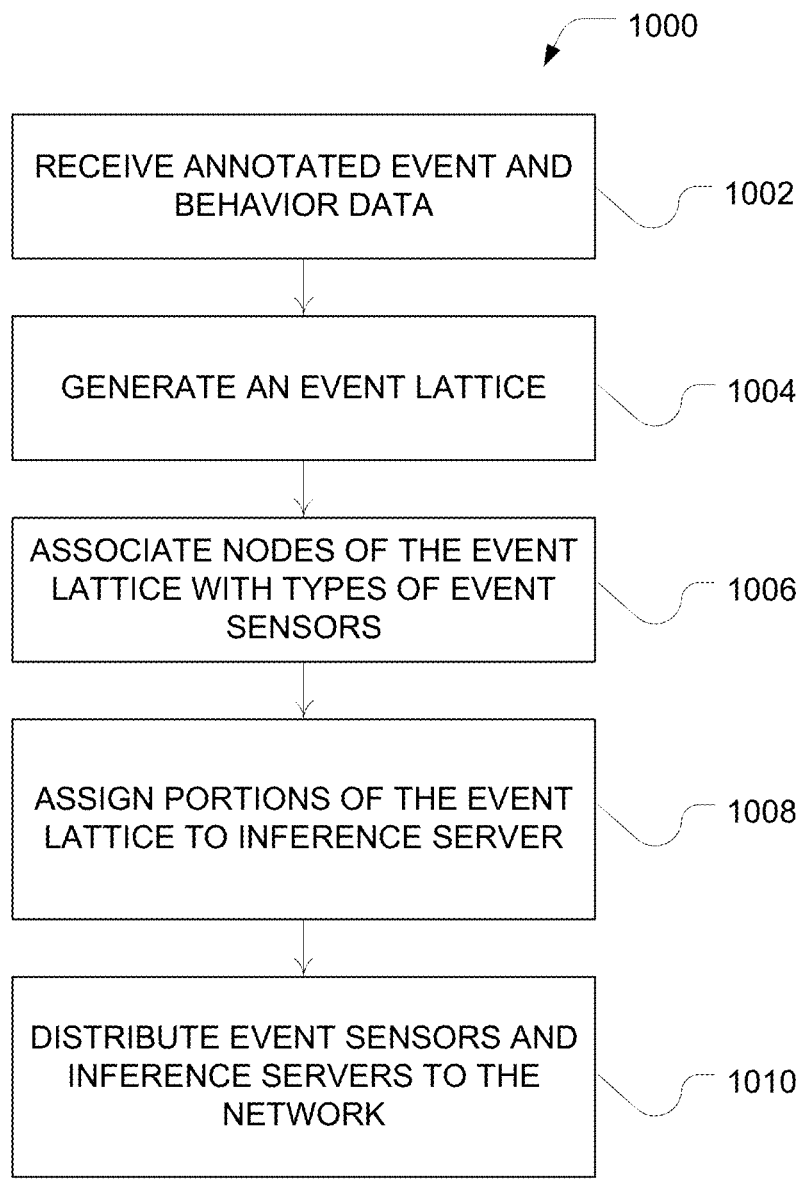
FIG. 10 includes a block flow diagram of an example method for establishing a cyber security system.

FIG. 10 is a block flow diagram of an example method 1000 for preparing a cyber security system. For example, the system can receive annotated event and behavior patterns, as illustrated at block 1002. Such annotated events can include event patterns that are either innocuous or harmful to computing assets. The events can be related to signatures within network traffic or can be related to actions and performance of a computing asset, such as a server.

As illustrated at block 1004, an event lattice can be generated using the received annotated events and behavioral pattern data. In an example, an event lattice can be generated using Formal Concept Analysis (FCA) or other concept analysis techniques, such as Triadic Concept Analysis or Fuzzy Concept Analysis. In a further example, a Markov model can be used in place of the event lattice, providing an indication of risk, or predicting subsequent events associated with a behavior pattern of an originator.

As illustrated at block 1006, attributes of the event lattice can be associated with types of event sensors to be deployed within computing assets. Event sensors include network packet sensors, performance sensors, application access sensors, or combinations thereof.

As illustrated at block 1008, portions of the event lattice can be assigned to inference servers in communication with the types of event sensors associated with the attributes or events of the event lattice. The inference servers and associated event sensors can be distributed to the computing assets to detect events of the event lattice and identify sessions and behavior indicative of a threat to the computing assets and further can provide a likelihood that the behavior is a threat to the computing assets, as illustrated at block 1010.

Figure 11:
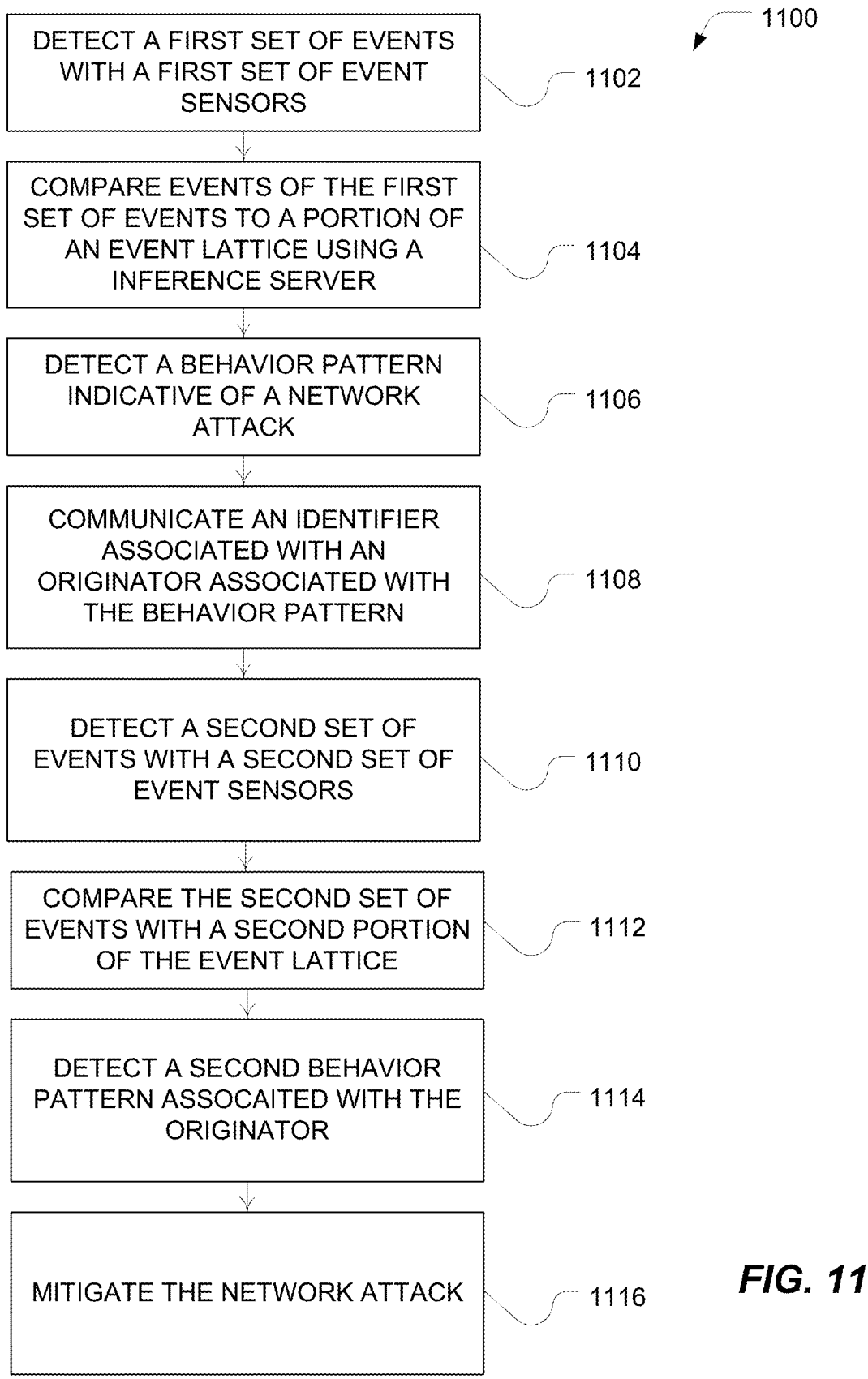
FIG. 11 includes a block flow diagram of an example method for protecting computing assets.

FIG. 11 includes an illustration of an example method 1100 for protecting computing assets. A first set of events can be detected using a first set of event sensors, as illustrated at block 1102.

As illustrated at block 1104, the first set of events can be compared to an event lattice using an inference server in communication with the first set of event sensors. Based on events associated with a session, an event or behavior pattern can be detected. In an example, a set of events or a behavior pattern is represented by a node of the event lattice. For example, a behavior pattern indicative of an attack on the computing assets can be detected, as illustrated at block 1106.

The first inference server can communicate an identifier associated with an originator associated with the pattern of behaviors indicative of an attack on the computing assets, for example, as illustrated at block 1108. In an example, the originator can be identified with an IP address, MAC address, session ID, or other identifier. This identifier can be communicated to other inference servers for further observation of the originator's behavior and can be communicated with a monitoring or management server, such as a cyber security server, to provide data to security system users, informing the security system users of the progress of any attack or suspicious activity on the computing assets.

As illustrated at block 1110, a second set of events can be detected with a second set of event sensors. The second set of event sensors can detect different types of events than the first set of event sensors or can detect similar types of events as the first set of event sensors. The second set of event sensors can be in communication with a second inference server.

As illustrated at block 1112, the second set of events can be compared to a second portion of an event lattice by the second inference server. As illustrated at block 1114, a second event pattern can be detected, or additional events associated with the identified behavior pattern can be detected. A further risk assessment can be provided by the second inference server to the cyber security server or other inference servers.

As illustrated at block 1116, users of the security system or the security system itself automatically, can mitigate risk associated with the attack on the computing assets. For example, a network access session can be terminated, network traffic from an IP address can be blocked, or a state of a virtual machine can be reversed or reset.

Figure 12:
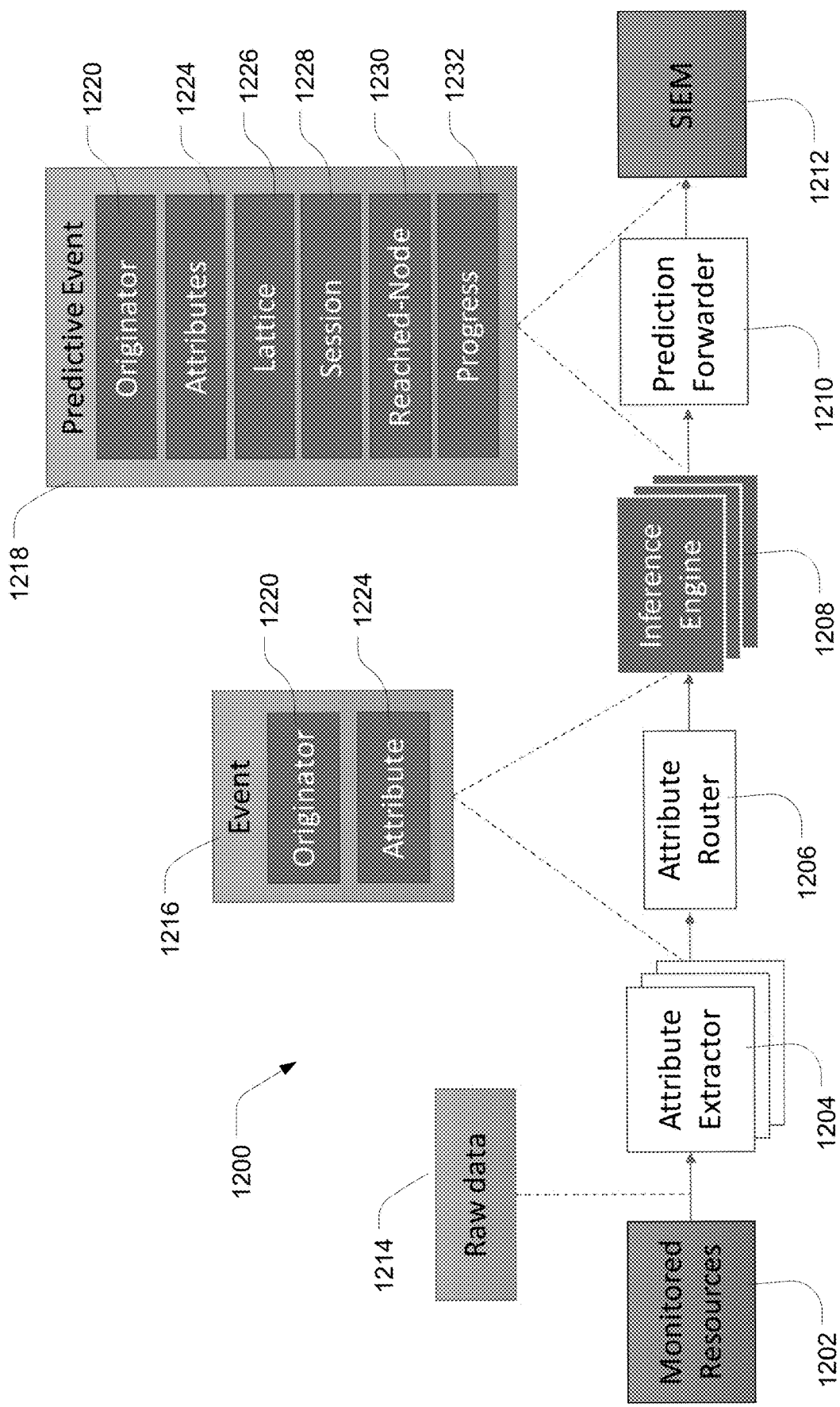
FIG. 12 includes an illustration of an example system for tracking a process.

FIG. 12 depicts a further example process and system 1200 relating to embodiments of the system described above. Such a system 1200 can be used to facilitate cyber security. In another example, the system 1200 can be used in other activities as described in more detail below. In particular, the system 1200 follows a sequence of events and predicts future events.

In the system 1200, monitored resources 1202 are monitored by attribute extractors 1204. For example, event sensors can extract raw data. Attribute extractors 1204, in the case of a cyber security system, can be implemented with the event sensors or in an inference server on devices, for example, as described above. The attribute extractors 1204 extract events 1216 from raw data 1214 associated with the monitored resources 1202. In a cyber security example, such raw data may include network packets. In a computing environment, such raw data 1214 can include application access, process events, data access, or combinations thereof. In other examples, such raw data 1214 can include transactions. The events 1216 can include an originator 1220 and an attribute 1224. For example, in the case of a cyber security system, an event 1216 can be associated with an originator 1220 accessing the computing assets and an attribute 1224 can be a detected signature in a data packet or activities within a server associated with requests from the originator. Optionally, the event 1216 can identify the attribute originator.

An event 1216 extracted by the attribute extractors 1204 can be provided to an attribute router 1206, which directs or reports the event to one or more inference engines 1208. In an example, the attribute router 1206 can be implemented with the attribute extractor 1204 or in network proximity to the attribute extractors 1204. For example, in a cyber security application, the attribute extractor 1204 and attribute router 1206 can be implemented in an event sensor. In another example, the attribute extractor 1204 can be implemented in an event sensor, and the attribute router 1206 can be implemented in an inference server in communication with the event sensor. In a further example, the attribute extractor 1204 and the attribute router 1206 can be implemented in an inference server in communication with the event sensor.

Each inference engine 1208 can include or be associated with a lattice or a portion of the lattice to which attributes are inputs. The attribute router 1206 can forward extracted attributes to an interference engine 1208 implementing the lattice or a portion of a lattice associated with the extracted attribute 1216. In an example, the inference engine 1208 can be implemented on an inference server. In another example, one or more inference engines 1208 can be implemented on a cyber security server. For example, the inference engines 1208 can be broadly distributed within a computing environment in proximity to attribute extractors 1204. In another example, the inference engines 1208 can be distributed to cyber security servers, for example, within zones of a computing environment. In a further example, the inference engines 1208 can be instantiated on a monitoring or management server. Other inference engines may be implemented in hypervisors or virtual machines monitoring other virtual machines within a computing environment.

The inference engine 1208 is to monitor events and track how such events are indicative of the behavior of the originator 1220 using a lattice or a portion of a lattice, such as the Formal Concept Analysis (FCA) lattice. As such, the inference engine 1208 can provide a predictive event 1218 that includes an identification of the originator 1220, and the attributes 1224 associated with the originator 1220. Further, the predictive event 1218 can indicate on which lattice 1226 the attributes 1224 are being tracked, a session 1228 associated with the originator 1220 and the extracted attribute 1216, the node 1230 reached by the originator 1220 during the session 1228 based on the attributes 1224 applied to the lattice 1226, and progress 1232 towards some goal or occurrence, such as a prediction regarding risk to computing assets or likelihood that a next node will be reached. In a cyber security setting, such a predictive event 1218 can indicate that an originator 1220 during a session 1228 has reached a node 1230 of a particular lattice 1226 that indicates significant progress 1232 towards harm to the computing assets.

The inference engine 1208 using a prediction forwarder 1210 forwards the predictive event 1218 to a monitoring or management server, such as a security information and event management system (SIEM) 1212, e.g., a cyber security server. The SIEM 1212 can monitor predictive events 1218 or activities that harm the computing assets, alert personnel, or other systems in charge of maintaining cyber security, and optionally, automatically take action to prevent further harm to the computing assets.

Figure 13:
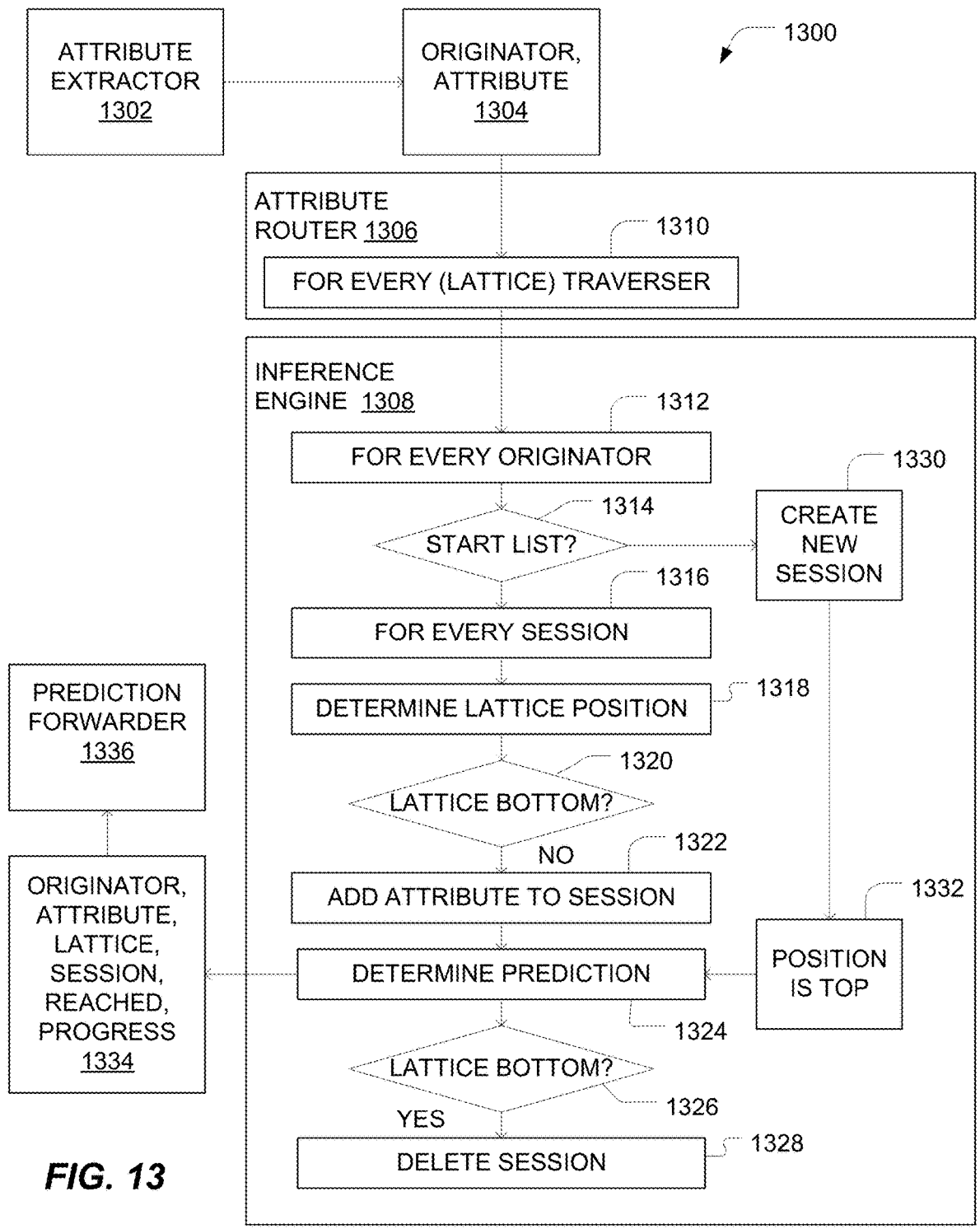
FIG. 13. includes a block flow diagram of an example method for monitoring a process.

In particular, the system can operate using a method 1300 illustrated in FIG. 13. For example, an attribute extractor 1302 extracts events 1304 that include an originator and an attribute. The event 1304 is provided to an attribute router 1306 that, for every lattice traverser, such as an inference server, determines whether to route the attribute to that lattice traverser, as illustrated at 1310.

For attributes routed to a particular inference engine 1308 (for example, instantiated on an inference server), for every originator, as illustrated at 1312, the inference engine determines whether the attribute is at the start of a new session, as illustrated at 1314. For ongoing sessions, for every session, as illustrated at 1316, the inference engine 1308 determines a lattice position based on the history of attributes discovered during the session, as illustrated at 1318. For example, the system determines the highest node that links to the highest number of attributes (see, for example, FIG. 2 or FIG. 4).

The system can then determine whether the position is at a lattice bottom, as illustrated at 1320. If the position is not at the lattice bottom, the system can add the attribute to the session, as illustrated at 1322, and can determine a prediction based on the lattice position, as illustrated at 1324.

If, as illustrated at 1314, a new session is being started from the originator, the inference engine 1308 can create a new session 1330, determine that the position on the lattice is at the top, as illustrated at 1332, and provide such positioning to the inference engine to determine the prediction, as illustrated at 1324.

The predictions can be provided to the prediction forwarder 1336 and include originator, attribute, lattice, session, reached nodes, and other progress notes, as illustrated at 1334. Depending on the nature of the lattice, the session, and the attributes discovered during the session, more than one node or child pathways within the lattice may be traversed by or during the session. In the event that all the nodes and child pathways have reached the bottom of the lattice, as illustrated at 1326, the session can be deleted, as illustrated in 1328.

Figure 14:
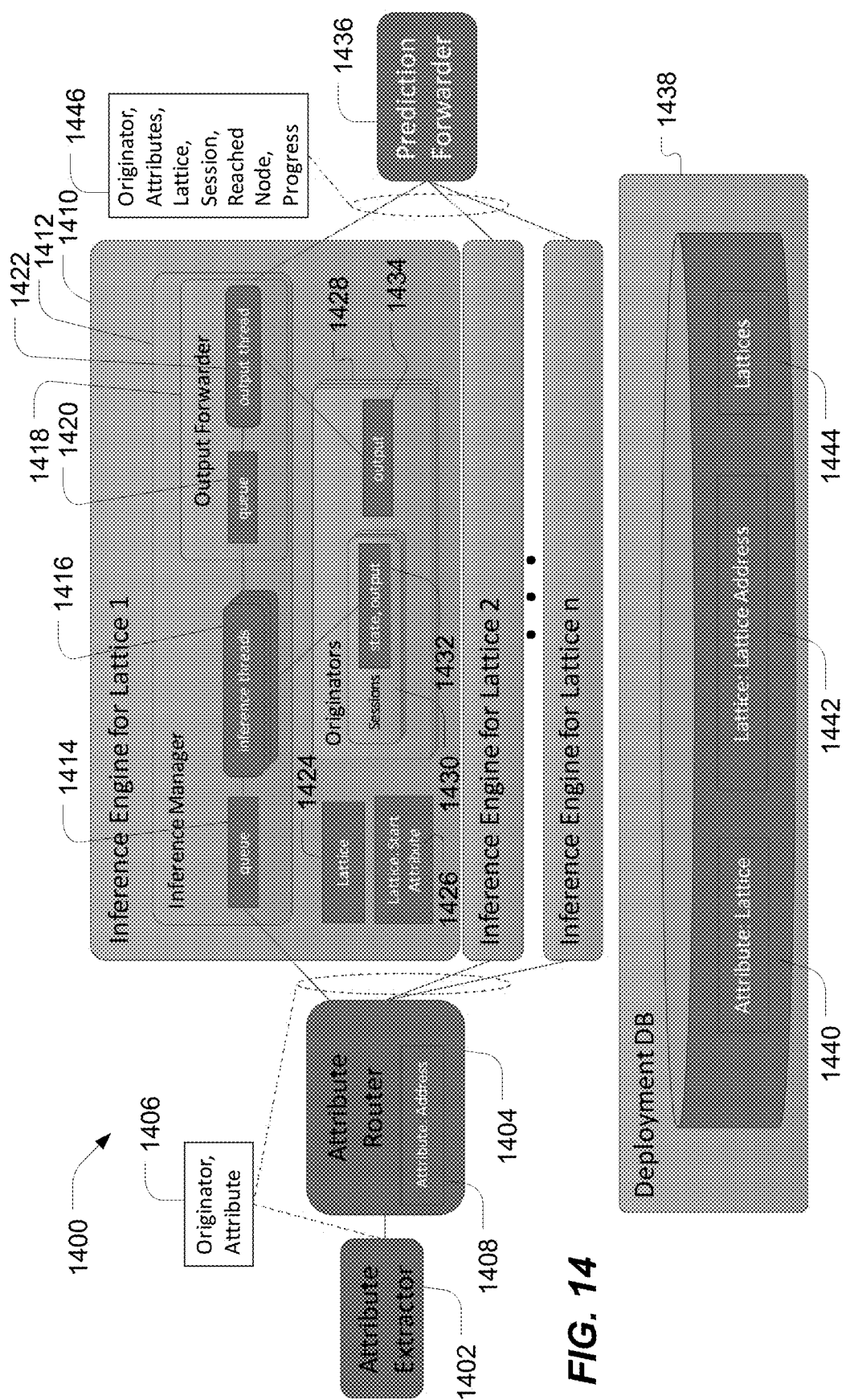
FIG. 14 and FIG. 15 include illustrations of example systems for tracking processes.

FIG. 14 includes an illustration of a system 1400 for providing predictions, for example, following the apparatuses, methods, and processes of FIG. 12 or FIG. 13. The system 1400 can include an attribute extractor 1402 associated with the data source. The attribute extractor 1402 can extract attributes and associate an originator with the attribute, as illustrated at 1406. The attribute extractor 1402 provides the attribute to an attribute router 1404. The attribute router 1404 includes a table or database 1408 associating an attribute with an address of an inference engine that includes a lattice utilizing the attribute as input.

The attribute router 1404 can forward the extracted attribute 1406 to one or more inference engines 1410. The inference engines 1410 can include different lattices or different portions of a lattice. The attribute router 1404 can forward the extracted attribute or event to an inference engine 1410 including a lattice associated with the attribute, for example, a lattice to which the attribute can be applied. For example, the attribute can have a position with the lattice. In an example, the attribute can have a top-level position indicating the start of a session.

In an example, the inference engine 1410 includes an inference manager 1412, which includes a queue 1414 to store the extracted attributes 1406 provided by the attribute router 1404. Inference threads 1416 access the extracted attributes stored within the queue 1414 and process such extracted attributes. In particular, the inference threads 1416 can associate an extracted attribute with an originator 1428 and a session 1430 associated with the originator. For example, the inference engine can instantiate a record associated with an originator 1428 that includes a set of sessions 1430 associated with the originator. The inference engine 1410 can include a set of records associated with a plurality of originators. Each of the sessions 1430 includes a state and an output 1432. For example, the inference thread 116 can compare the extracted attributes associated with a session 1430 to a lattice 1424 to determine the state or output 1432, such as a reached node. Further, the inference engine 1410 can include a database 1426 of start attributes associated with the lattice to determine when to start a new session 1430.

The inference manager 1412 can further include an output forwarder 1418. Information processed by the inference threads 1416 can be provided to a queue 1420 and the outputs 1434 provided through an output thread 1422 to a prediction forwarder 1436. In an example, the outputs 1446 include an identifier associated with the originator, an attribute, a lattice identity, a session identifier, the node reached within the session, or an indication of progress towards some goal or occurrence. Optionally, the inference engine can opt to report or not report results to the prediction forwarder 1436 based on the reached node or a risk level associated with the reached node.

Further, the system 1400 can include a deployment database 1438. In an example, the deployment database 1438 includes a database associating attributes with lattices, as illustrated at 1440. Further, the deployment database 1438 can include a database 1442 associating lattice addresses with a particular lattice. In addition, the deployment database 1438 can include the lattices 1444. For example, the lattice address can be the address of an inference engine implementing the lattice. In a cyber security application, the inference engine may be an inference server implementing a lattice. In another example, the inference engine implementing the lattice may be found on a monitoring server, such as a cyber security server. Other inference engines may be implemented in hypervisors monitoring virtual machines within a computing environment.

Figure 15:
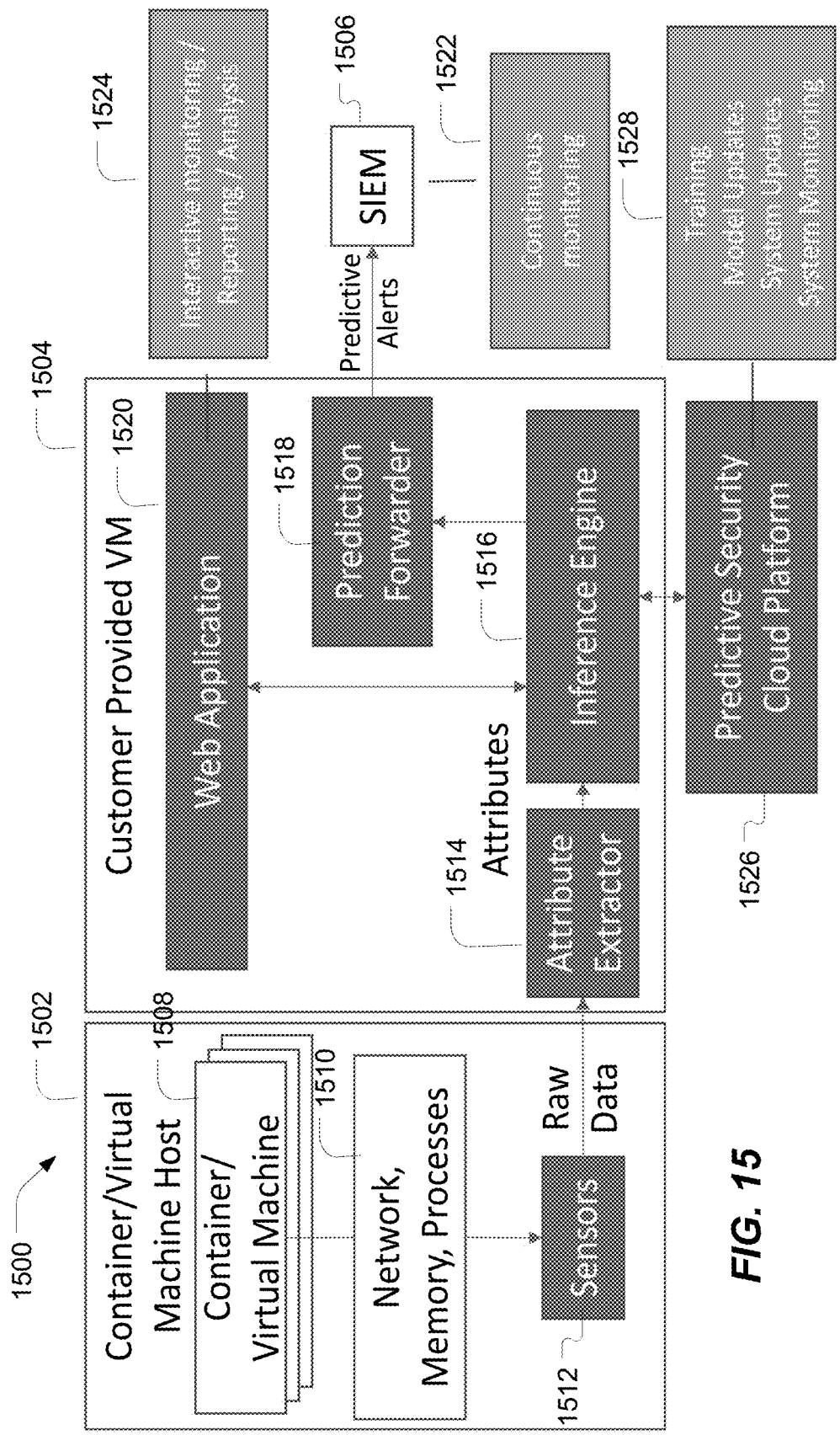

In a particular example of the above systems and processes of FIG. 12, FIG. 13, and FIG. 14, a system 1500 illustrated in FIG. 15 includes one or more hosts 1502 in communication with computing resources 1504, such as one or more virtual machines, for example, an inference server, implementing aspects of a cyber security system. The computing resources 1504 can be in communication with an SIEM 1506.

One or more hosts 1502 can include a set of containers or virtual machines 1508 that implement activities 1510, such as network access, memory access, or various processes. Such activities 1510 are monitored by one or more sensors 1512 that provide raw data to an attribute extractor 1514 implemented on the computing resource or resources 1504.

A host 1502 and, optionally, the container or virtual machine 1508 constitute a monitored resource. The raw data collected by the sensor 1512 can associate an identity of the monitored resource with the raw data, and the attribute extracted by the attribute extractor 1514 can be associated with the monitored resource.

The computing resources 1504, for example, an inference server, can include the attribute extractor 1514 and one or more inference engines 1516. Optionally, the computing resource 1504 includes a single inference engine 1516. In another example, the computing resource 1504 includes a plurality of inference engines 1516. The attribute extractor 1514 provides attributes, and information about such attributes, such as an identity of the originator associated with the attribute that was extracted to the inference engine 1516.

As above, the inference engine 1516 generates a predictive event that is provided to the prediction forwarder 1518. The prediction forwarder 1518 provides prediction alerts or predicted event to the SIEM 1506.

Optionally, a web application 1520 can interact with the inference engine 1516 to allow external systems 1524 to interactively monitor, report, and analyze behaviors of the inference engine 1516 and the progress of sessions being monitored by the inference engine.

The SIEM 1506 can utilize the predictive events or predictive alerts to provide for continuous monitoring 1522 of one or more computing resources 1504 monitoring a plurality of hosts 1502. While FIG. 15 illustrates a single computing resource 1504 with a single inference engine, the system can include a plurality of computing resources 1504 each including at least one inference engine 1516 and optionally, a plurality of inference engines 1516. When the predictive events or alerts indicate a problem, the SIEM 1506 can alert users or automatically take appropriate actions.

In an example, the inference engines 1516 associated with the computing resources 1504 can be managed and monitored by a predictive security cloud platform 1526. In particular, the predictive security cloud platform 1526 has access to training module updates, system updates, and system monitoring processes 1528 that can be utilized in formulating lattices to be used in part or in whole by the inference engine 1516. In particular, the predictive security cloud platform 1526 can incorporate attribute lattice databases, lattice and lattice address databases, and various lattices useful in determining progress of an attack on the computing assets. The predictive security cloud platform 1526 can provide to the inference engine 1516 a lattice or a portion of a lattice to be utilized by the inference engine to characterize the behaviors and attributes determined from the one or more monitored resources, such as hosts 1502 and containers/virtual machines 1508.

Figure 16:
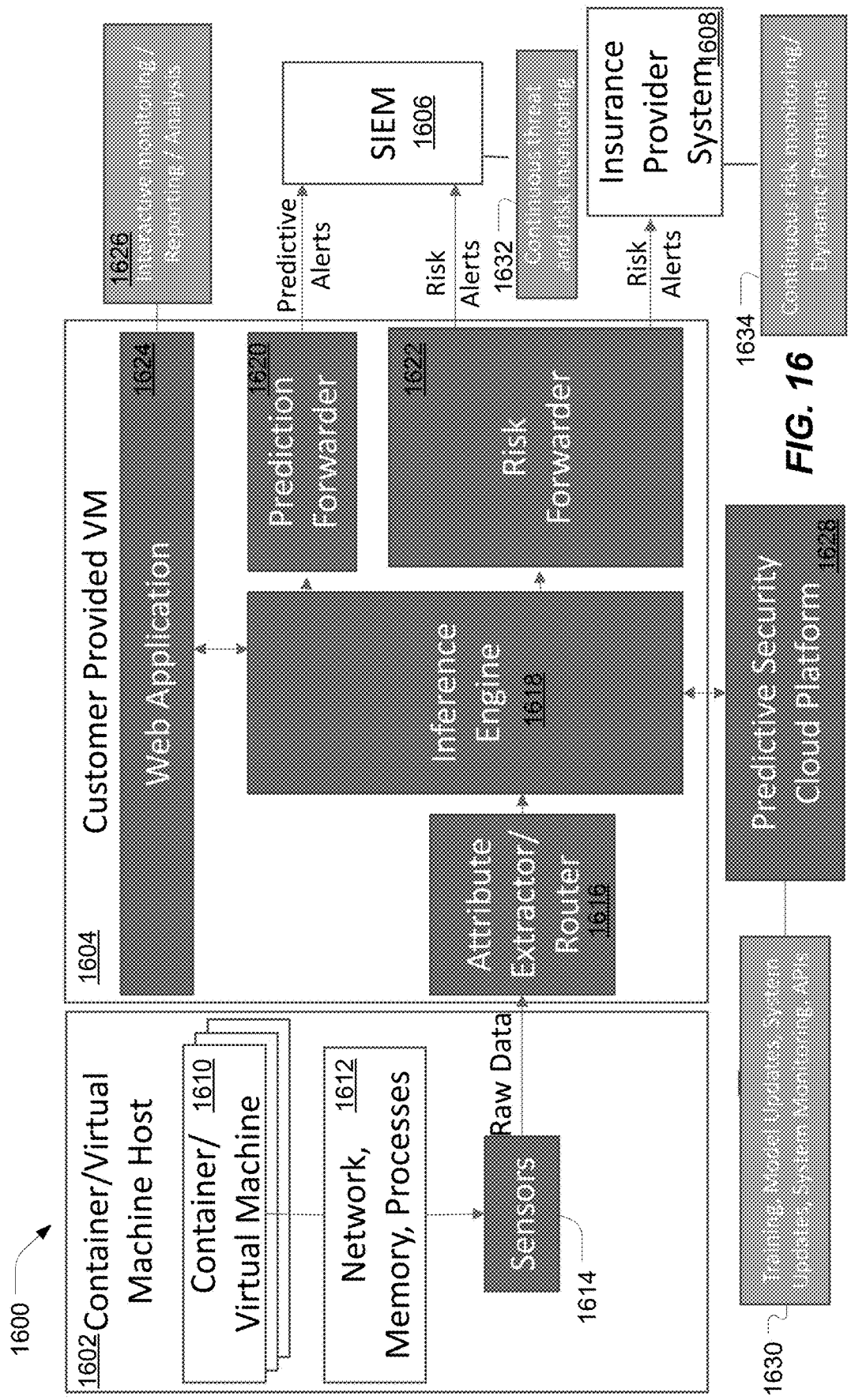
FIG. 16 and FIG. 17 include illustrations of example systems for tracking processes and loss risk monitoring.

In a further example, FIG. 16 illustrates an embodiment of the system 1600 having similar components to the system of FIG. 15 with the inclusion of additional components associated with an insurance provider. For example, the system 1600 includes a container/virtual machine host 1602 that includes one or more virtual machines 1610, network, memory, and other process resources 1612 that are monitored by one or more sensors 1614. The one or more sensors 1614 provide raw data to an attribute extractor/router 1616 implemented on a virtual machine 1604.

An inference engine 1618 implemented by the virtual machine 1604 receives attributes extracted by the attribute extractor/router 1616 and, using a detection model, such as an event lattice, provides a prediction to the prediction forwarder 1620 that provides predictive alerts to an external system, such as an SIEM 1606. The SIEM 1606 can continuously monitor risk and threats at 1632. The inference engine 1618 can also be in communication with the web application 1624 that permits interactive monitoring/reporting/analysis at 1626. Further, the inference engine 1618 can be in communication with the predictive security cloud platform 1628 that performs training, module updates, system updates, system monitoring and provides application interfaces at 1630.

In an additional example, the inference engine 1618 can detect a risk of loss or a loss event. A loss event may be an event in which an attack yields access to sensitive data, confidential information, or valuable subsystems. A risk factor can include a determination as to the proximity of a reached node to a node indicative of a loss. If detected, the inference engine 1618 can provide a risk factor or an alert regarding a loss event to external monitoring systems. For example, the inference engine 1618 can forward risk factors or alerts to a risk forwarder 1622. The risk forwarder 1622 can forward the risk factor or alerts to the SIEM system 1606. Further, the risk forwarder 1622 can forward the risk factors or alerts to an insurance provider system 1608. The insurance provider system 1608 can continuously monitor risk, as illustrated at 1634.

Further, the insurance provider system 1608 can determine premiums of an insurance policy based on a set of risk factors and alerts regarding risk events. In an example, the insurance provider system 1608 can dynamically determine premiums, adjusting premiums in response to receiving ongoing updates on risk factors and loss event alerts. In other words, the insurance premiums may change based on the performance of a cybersecurity system in preventing attacks from reaching nodes proximal to nodes indicating a loss or preventing a loss event from happening.

Figure 17:
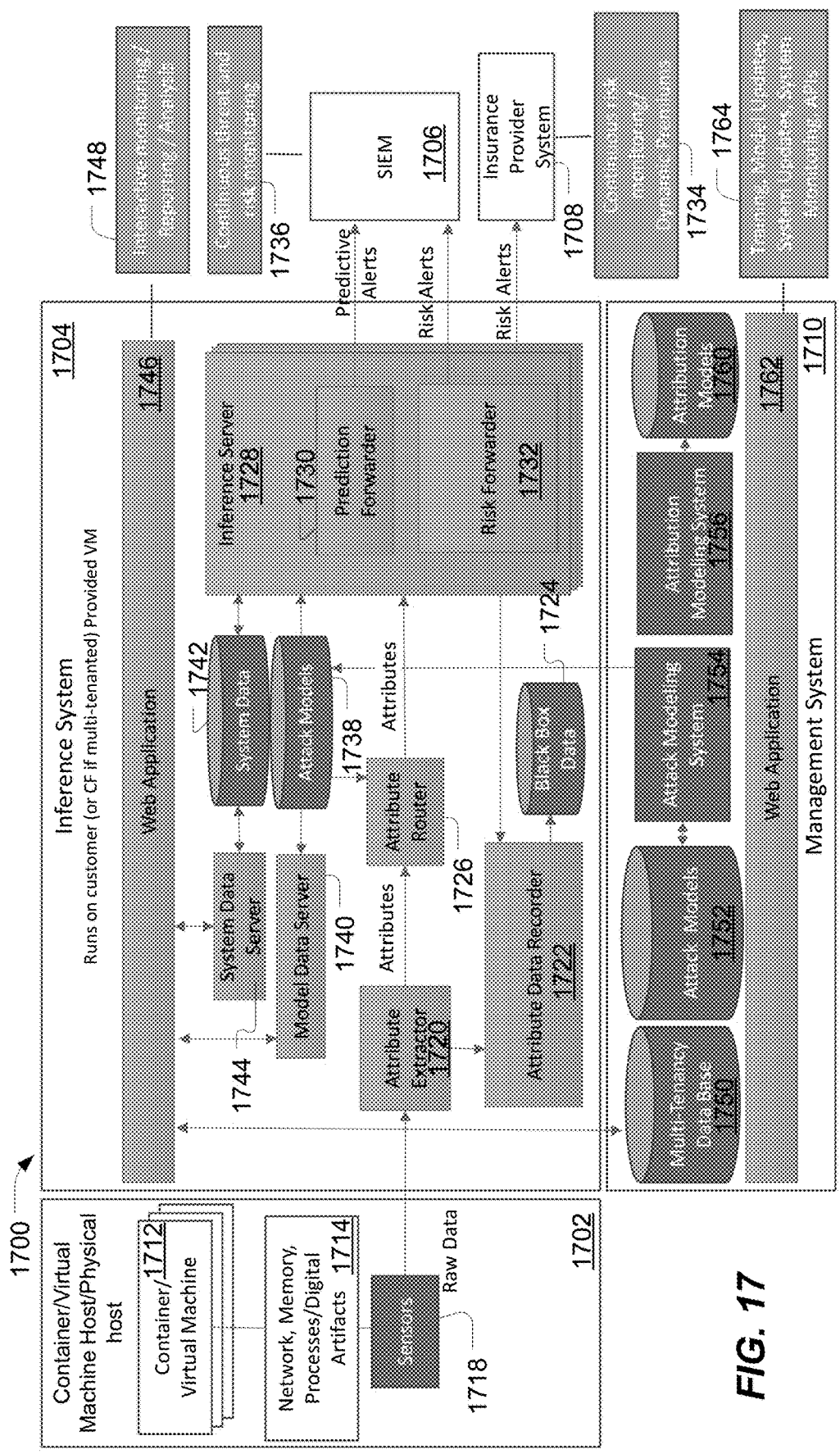

FIG. 17 includes an illustration of a system 1700 that finds particular use in cloud computing environments. A virtual or physical host 1702 includes a plurality of container/virtual machines 1712 and associated network, memory, process, and digital artifact resources 1714. Event sensors 1718 collect raw data from the associated resources 1714 and virtual machines 1712 and provide the raw data to an attribute extractor 1720 associated with an inference system 1704. The inference system 1704 can run on a virtual machine. The virtual machine can be a customer provided virtual machine or a cloud resource, particularly if the system is monitoring a multi-tenanted cloud-based resource.

The attribute extractor 1720 can provide attributes to an attribute router 1726. The attribute router 1726 can route the attributes to one of a set of inference servers 1728. In particular, attack models 1738 may each be used in association with particular attributes. The attribute router 1726 can route the attribute to inference server 1728 that monitors or utilizes an associated attack model 1738. The attribute extractor 1720 can further provide the attributes to an attribute data recorder 1722 that stores information about detected attributes in a database 1724.

The inference servers 1728 can apply the extracted attributes to attack models 1738 to determine patterns of behavior by users of the system. In particular, the inference server 1728 can predict risk within the system and can provide indications of risk to prediction forwarder 1730 that provides predictive alerts to an external management or monitoring system (e.g., SIEM 1706). The SIEM system 1706 can continuously monitor threats and risk at 1736.

In addition, the inference server 1728 can use the attack models 1738 to assess risk factors associated with loss events or to detect such loss events. In an example, the inference server 1728 can includes modules and functionality describe in relation to the inference engine describe above, for example at FIG. 14. In such a case, the inference server 1728 can provide risk factors and risk loss alerts to a risk forwarder 1732 that provides the risk factors and loss alerts to the SIEM system 1706 or to an external insurance provider system 1708. Alternatively, the risk factors can be communicated to the SIEM system 1706, which forwards the risk factor to the insurance provider system 1708. The insurance provider system 1708 can then use the risk factors and loss alerts to continuously monitor risk and dynamically determine insurance premiums at 1734.

A management system 1710 can be utilized to model and assign attribution modeling and attack modeling into the inference system 1704. For example, the management system 1710 can include an attack modeling system 1754 in communication with an attack model archive 1752. The attack modeling system 1754 can provide attack models 1738 to the inference system 1704. Similarly, the system can include attribution modeling system 1756 that includes archive attribution models 1760 that can be provided to assist with attribute extraction. The management system 1710 can include a web application interface 1762 that allows for training, model updates, system updates, system monitoring and implementation of application interfaces at 1764. In the case of a cloud computing environment, the management system 1710 further includes a multi-tenancy database 1750 that interacts with a web application interface 1746 of the inference system 1704.

The inference system 1704 can further include system data database 1742 that interacts with a server 1744 and the inference servers 1728. A model data server 1740 can also interact with the web application 1746 and the attack models 1738. Using the web application 1746 interaction, monitoring, reporting and analysis (1748) can be performed for the inference system 1704.

In particular, the system acts to detect events, extract attributes from events, and predict behaviors associated with originators of those events. In particular, some behaviors and some events are indicative of a risk of a loss event or are indicative of a loss event. As such, the system can further assess risk factors of the loss associated with the behaviors originators as indicated by events. While many events are innocuous and may occur during nonthreatening use of the systems, some events represent the risk to the security of the system. Some events, indicating a breach in security provide access only to less important systems and low value data, whereas other breaches of security represent or lead to access of data or information or system resources having significant consequences and potentially costly outcomes. The present system differentiates between routine security risk and risk of loss and provides for monitoring of risk of loss for establishing insurance premiums and quickly implementing loss mitigation measures.

Figure 18:
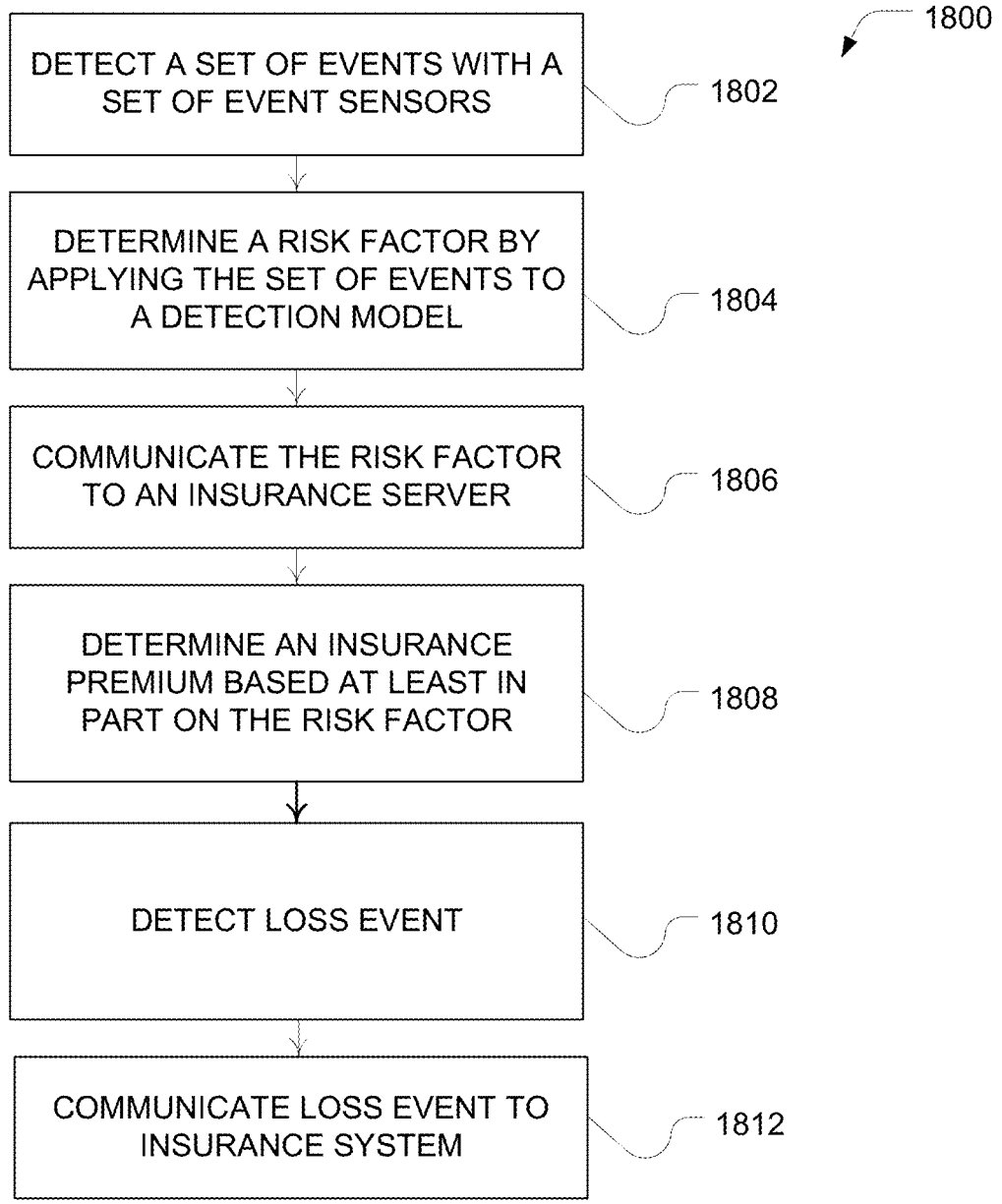
FIG. 18 and FIG. 19 includes block flow diagrams illustrating example methods for assessing and mitigating risk of loss.

In an example, FIG. 18 illustrates an example method 1800 for determining risk and detecting loss risk events. As illustrated at block 1802, a set of events is detected with a set of event sensors. In an example, the set of events can be distributed within network systems or on virtual machines within computing resources. The detected events can be provided, for example, to event or attribute extractors that route extracted attributes to appropriate inference servers.

As illustrated at block 1804, the inference servers can utilize the set of events to determine a risk factor by applying the set of events to a detection model. As described above, the detection model can include a set of nodes. Nodes indicate activity proximal to nodes indicative of loss events. Risk within the system may further be augmented by information such as data accessible by the compromised resource, the source of the attack, and the historical ability of the system to mitigate the attack, among other factors.

Once determine, the risk factor can be communicated to an insurance server, as illustrated at block 1806. For example, the inference engine can provide risk factors to a risk forwarder that provides the risk factor to an insurance system and optionally, to a monitoring or management system.

In an example, the insurance system can determine an insurance premium based at least in part on a risk factor, as illustrated in block 1808. Other factors that may influence an insurance premium can include the number of attacks, the historic ability of the system to mitigate those attacks, source of the attacks, the fiscal consequences of exposure of sensitive information, or customer data stored on the attacked system, and previously established loss mitigation protocols, among other factors. In particular, the insurance system can continuously monitor the behavior of the cybersecurity system and the number and progress of attacks and can dynamically adjust insurance premiums accordingly. For example, an insurance contract may establish a range of insurance premiums. During seasons in which attacks are low and the success of such attacks is mitigated, insurance premiums may be within the lower end of the range. On the other hand, when attack on a particular high valued resource increase, insurance premiums can increase.

On occasion, a node within an event lattice may indicate that the loss event has occurred. For example, the system can detect a loss event, as illustrated at block 1810. The loss event can then be communicated to a management or monitoring system and can be communicated to the insurance system, as illustrated at block 1812. The insurance system may implement a previously established loss protocol.

Figure 19:
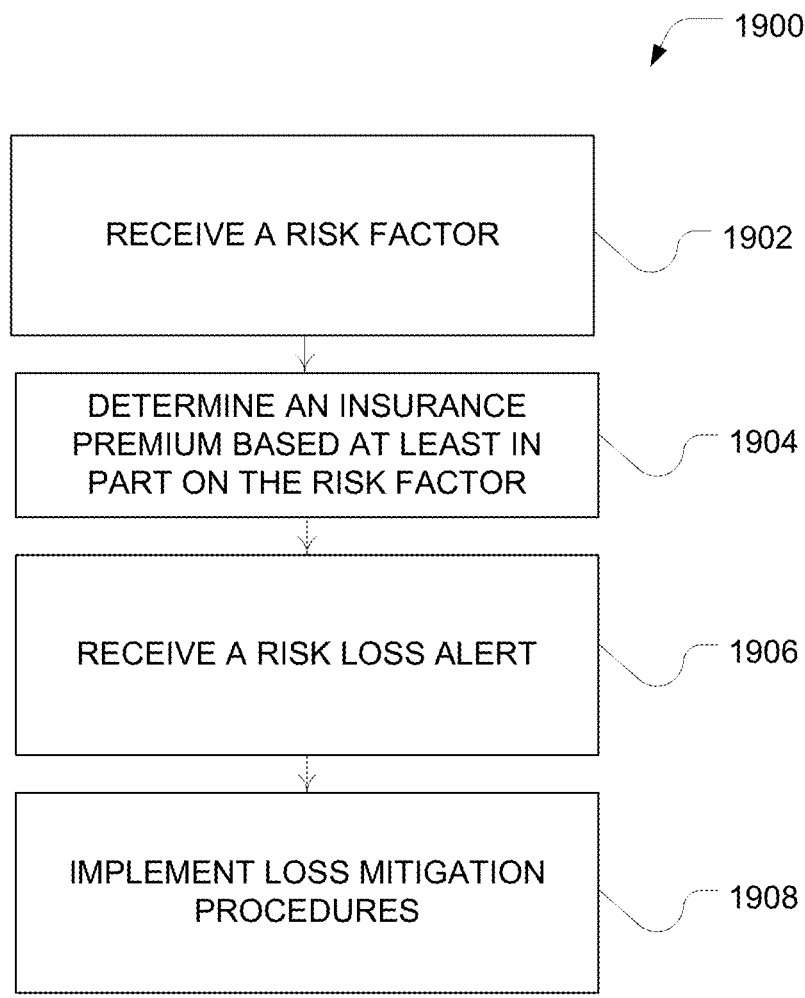

The insurance system may elect to determine insurance premiums and mitigate losses as illustrated in the method 1900 of FIG. 19. For example, a risk factor can be received from a monitoring system or inference servers associated with a cybersecurity system, as illustrated at block 1902. The insurance system can then determine insurance premiums based at least in part on the risk factor, as illustrated block 1904. Other factors that may further influence premiums include the number of attacks, the historic ability of the system to mitigate those attacks, source of the attacks, the fiscal consequences of exposure of sensitive information, or customer data stored on the attacked system, and previously established loss mitigation protocols, among other factors. In particular, premiums may be determined dynamically based on risk factors and the historic performance of the cybersecurity system.

Further, the system may receive a risk loss alert, as illustrated at block 1906. Such a risk loss alert may be indicative of a breach in security around an asset that has access to valuable information or sensitive resources. Accordingly, the insurance system can implement previously established loss mitigation procedures or protocols, as illustrated at block 1908. Often, the financial consequences of loss can be mitigated based on the speed of response and the expedited implementation of loss mitigation procedures. In some jurisdictions, liability for loss of customer data is reduced based on proactive response to a loss. Further, government fines in some jurisdictions may be mitigated or eliminated through the quick detection and implementation of the loss protocols.

Figure 20:
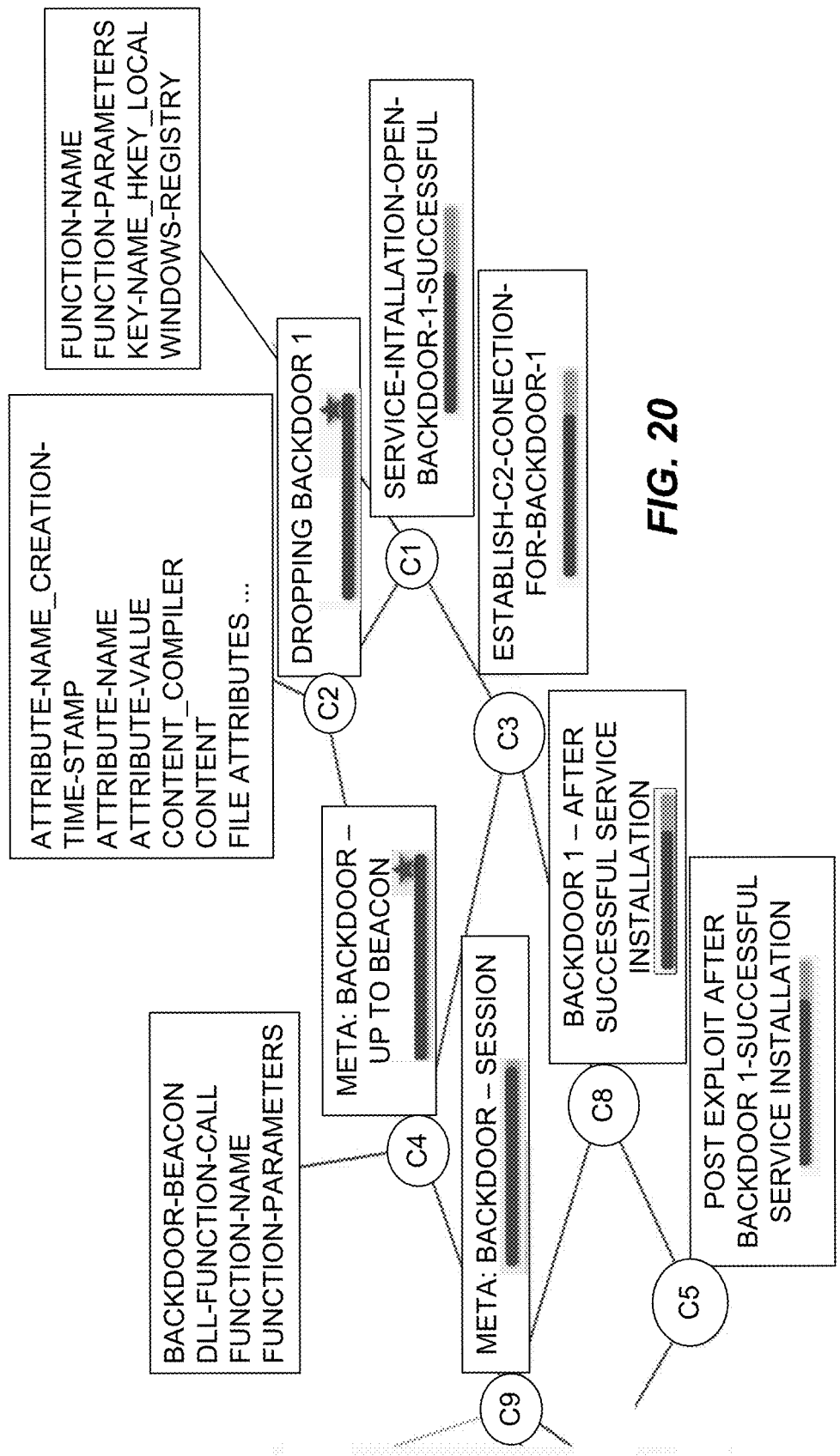
FIG. 20 includes an illustration of an example user interface associated with a cyber security system.

The system can provide real-time monitoring and notification of risks to computing assets. FIG. 20 includes an illustration of an example interface illustrating the progress of one or more attacks on the computing assets. The interface can represent progress of each attack toward a point of harming the computing assets. In another example, the interface can illustrate a progress toward a node representing risk to the computing assets or progress toward an end goal of breaching cyber security. A security system user can be notified when an attack reaches a node representing a breach or progress toward a node that represents risk to the computing assets.

Figure 21:
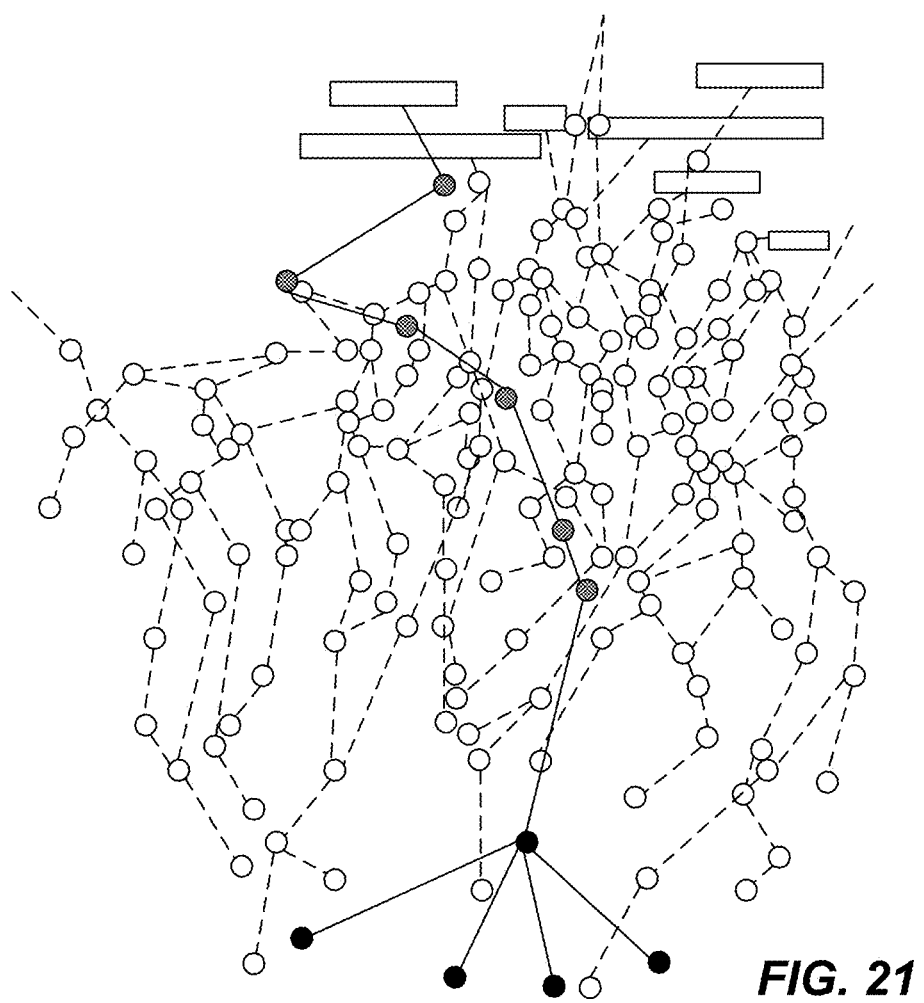
FIG. 21 includes an illustration of an example event lattice.

FIG. 21 illustrates an example events lattice. As events attributed to a user of a computing resource are collected, the connection of nodes is illustrated as a path indicative of the user's behavior. As more events are collected, the path traverses to a node indicating proximity to other nodes that may represent harm to the computing assets. As such, the actor reaching a particular node may be identified as a potential malicious actor or breach to cyber security, and the system can take appropriate action.

Such monitoring of nodes is further illustrated in FIG. 22 in which landing on a Node C69 represents risk to the computing assets, whereas other nodes may be designated as not representing risk to the computing assets. When a user traverses the events lattice landing on nodes designated as high risk, the system may take further action to mitigate such risk.

For example, as illustrated in FIG. 23, an interface for monitoring user behavior can assign risk based on the nodes traversed by the user. In the illustrated example, two of the users, identified by session ID, for example, ending in c4f2b5 or 8f7a58, do not have behaviors indicative of risk. However, one of the users' behaviors has a pattern leading to nodes within the event lattice that represents risk, such as proximity to nodes that represent a breach of cyber security. In the illustrated example, the user, identified by session ID ending in b1b61c, is denoted as having a 0.71 risk. In an example, probabilities associated with predicted future events or a risk level associated with a detected behavior pattern can be determined based on the node associated with the set of events. For example, a percentage of harmful nodes following the pattern can be indicative of risk. In another example, a distance to a high-risk node (e.g., number of further events or leaps to further nodes) that represent harm to the computing assets can be used to assess risk. When a user (e.g., session ID ending in 8022bc) exhibits sets of behaviors (e.g., a set of events represented by a node) that make clear the user is acting maliciously, the risk level rises to 1. The system may be configured to act based on different thresholds to mitigate security risks or monitor activity.

While the example above relates to mitigating cyber security risk, such an approach can be utilized in addressing other data monitoring activities, particularly where distributed monitoring of activity is desired. For example, such a system could be used to monitor breaches of cyber data security that represent cost to cyber insurance policies. In other examples, the system can be utilized to monitor bank or insurance fraud, terrorist activity, filesystem activity, process management, user, or consumer behavior, among others, or any combination thereof.

In an example, the system can be used to monitor fraud, such as within a banking system. Event sensors can be distributed across the banking computing assets to detect transactions and other activities and then can be used in correlating such activities with an event lattice. As nodes within the lattice indicative of fraud activity are identified and activated, the system can be alerted to monitor further activity by a user. In such a manner, transactions and attributes attributed to an individual can be used to determine a probability or likelihood of fraud, not merely anomalies. Similarly, such a fraud monitoring system can be utilized in association with insurance fraud, such as medical insurance or automobile insurance fraud.

In another example, such monitoring systems can be utilized to detect terrorist activity within a network. For example, sensors can be established in various computing assets associated with contacts, texting, email, phone logs, browsing history, social media among others or any combination thereof. As events are detected, such events can be sent to various inference engines, for example, correlator agents, that further alert a central system to potential terrorist activity.

In another example, such a system can be utilized to monitor filesystems, following filesystem activity to detect events across large, distributed data systems. In another example, such monitoring systems can be utilized to monitor process management, for example of virtual machines managed by a hypervisor. Further, a system can monitor rootkit activity, changes to process tables, such as processes disappearing, changes to memory, such as changes to the basic structure of memory, extraction processes associated with restricted data, or other process management behavior. While such a system can be utilized to monitor security issues, such systems can also be utilized to monitor performance of the system and provide early detection of inefficiencies or potential problems within the system. Further, such systems can be utilized to monitor network performance and process management.

In an additional example, user behavior or consumer behavior can be monitored using such a system. Various sensors can be applied across the computing assets providing consumer content or e-commerce. In such an example, user behaviors can be provided to various correlator agents that can compare user behaviors to a behavior lattice and report to the central system the behaviors of a user or consumer. The system can predict likelihood or exiting or buying. Such systems can be used as a recommendation system or to predict consumer or buyer behavior. For example, the output can be a factor associating a user with a cohort that has interest in particular video content or products and can influence the display of such content to a user. Further, the sequence of events can incorporate access events, buying history, browser history, demographics, and other factors to predict behavior or subject matter interest.

In an additional example, the lattice system can be used for logistics, monitoring events and transactions, and providing input regarding demand, low inventory, or problems with the supply chain.

In a first aspect, a method for protecting computing assets includes detecting a set of events associated with an originator using a set of event sensors; comparing, using an inference server in communication with the set of event sensors, the detected set of events to a detection model; determining a pattern of behavior indicative of an attack on the computing assets based on the comparing; and communicating, using the inference server, an identifier associated with the originator.

In an example of the first aspect, the detection model includes an event lattice.

In another example of the first aspect and the above examples, the event lattice is derived using Association Rule Learning. In an example, Association Rule Learning includes Formal Concept Analysis. In a further example, Association Rule Learning includes Frequent Item Sets. In another example, Association Rule Learning includes Triadic Concept Analysis.

In an additional example of the first aspect and the above examples, the event lattice includes a set of nodes, a node of the set of nodes indicative of the attack on the computing assets. For example, the method further includes when communicating the identifier, communicating the node. In an example, a risk associated with the node is determined based on a number of steps to a node representing a breach of cyber security. In another example, a risk associated with the node is determined based on a percentage of nodes representing a breach of cyber security are in the lattice below the node.

In a further example of the first aspect and the above examples, determining the pattern of behavior includes determining a node of the event lattice correlated with the set of events. For example, the method further includes detecting a second set of events associated with the originator using a second set of event sensors. In an example, the method further includes comparing the second set of events to the event lattice using a second inference server; and determining a further pattern of behavior indicative of the attack on the computing assets based on the comparing and the pattern detected by the inference server. For example, the method further includes communicating the identifier to a cyber security server with the second inference server.

In another example of the first aspect and the above examples, communicating includes communicating with a cyber security server.

In a further example of the first aspect and the above examples, communicating include communicating with another inference server.

In an additional example of the first aspect and the above examples, an event of the set of events includes a detected signature in a network packet.

In another example of the first aspect and the above examples, an event of the set of network events includes a memory usage pattern.

In a further example of the first aspect and the above examples, an event of the set of events includes a central processing unit usage pattern.

In an additional example of the first aspect and the above examples, an event of the set of events includes an application access.

In a second aspect, a method for protecting computing assets includes detecting a set of events associated with an originator using a set of event sensors implemented on equipment; determining, using an inference server in communication with the set of event sensors, a node position within an event lattice based on the detected set of events, the event lattice including a set of nodes, a node of the set of nodes indicative of the attack on the computing assets; and communicating from the inference server, an identifier associated with the originator and the node position.

In an example of the second aspect, the event lattice is derived using Association Rule Learning. For example, Association Rule Learning includes Formal Concept Analysis. In another example, Association Rule Learning includes Frequent Item Sets. In a further example, Association Rule Learning includes Triadic Concept Analysis.

In another example of the second aspect and the above examples, the method further includes determining a risk associated with the node position. For example, the risk associated with the node position is determined based on a number of steps to a node representing a breach of cyber security. In another example, the risk associated with the node position is determined based on a percentage of nodes representing a breach of cyber security are in the lattice below the node.

In a further example of the second aspect and the above examples, the method further includes detecting a second set of events associated with the originator using a second set of event sensors implemented on equipment. For example, the method further includes determining a second node position in a second event lattice based on the second set of events using a second inference server. In an example, the method further includes communicating the node position from the inference server to the second inference server, wherein determining the second node position includes determining the second node position based on the second set of events and the node position. In an additional example, the method further includes communicating the identifier and the second node position to the cyber security server from the second inference server.

In an additional example of the second aspect and the above examples, communicating includes communicating with a cyber security server.

In another example of the second aspect and the above examples, communicating includes communicating with another inference server.

In a further example of the second aspect and the above examples, communicating includes communicating the identifier, the node position, the lattice, and the session identifier. For example, communicating further includes communicating a progress.

In an additional example of the second aspect and the above examples, an event of the set of network events includes a detected signature in a network packet.

In another example of the second aspect and the above examples, an event of the set of network events includes memory usage patterns.

In a further example of the second aspect and the above examples, an event of the set of network events includes central processing unit usage patterns.

In an additional example of the second aspect and the above examples, an event of the set of network events includes an application access.

In a third aspect, a cyber security system includes a plurality of event sensors to detect events; a plurality of inference servers, each inference server of the plurality in communication with a subset of event sensors of the plurality of event sensors, the each inference server having an event lattice and to compare an event detected by the subset of event sensors to the event lattice, the each inference server to identify an originator having a behavior pattern indicative of an attack and communicating an identifier associated with the originator; and a server in communication with the plurality of inference servers, the server to provide an interface indicating the behavior pattern indicative of a network attack and the identifier of the originator.

In an example of the third aspect, the event lattice of the each inference server is different from the event lattice of another inference server of the plurality of inference servers.

In another example of the third aspect and the above examples, the event lattice includes a set of event nodes and a set of nodes linked to event nodes of the set of event nodes, each node having a node position. For example, the behavior pattern of the originator is indicated by the node position.

In a further example of the third aspect and the above examples, the system further includes an event router to direct the detected events to an inference server of the plurality of inference servers based on the event lattice implemented by the inference server.

In an additional example of the third aspect and the above examples, the event lattice is derived using Association Rule Learning. For example, Association Rule Learning includes Formal Concept Analysis. In another example, Association Rule Learning includes Frequent Item Sets. In an additional example, Association Rule Learning includes Triadic Concept Analysis.

In another example of the third aspect and the above examples, an event sensor of the plurality of event sensors is to detect events comprising a signature in a network packet.

In a further example of the third aspect and the above examples, an event sensor of the plurality of event sensors is to detect events comprising memory usage patterns.

In an additional example of the third aspect and the above examples, an event sensor of the plurality of event sensors is to detect events comprising central processing unit usage patterns.

In another example of the third aspect and the above examples, an event sensor of the plurality of event sensors is to detect network event comprising an application access.

In a fourth aspect, a method for preparing a cyber security system includes receiving annotated event and behavior data, a portion of the event and behavior data indicative of an attack on computing assets; forming an event lattice using formal concept analysis of the annotated event and behavior data, the event lattice including nodes associated with events, the event lattice including at least one behavior pattern indicative of an attack on the computing assets; and configuring event sensors to detect events associated with nodes of the event lattice.

In an example of the fourth aspect, the method further includes dividing the event lattice into portions, each portion associated with a set of event sensors. For example, the method further includes assigning a portion of the event lattice to an inference server associate with the set of event sensors. In an example, the method further includes deploying the event sensors and the inference server to the computing assets. In another example, deploying includes installing the inference server on a device. For example, the device is a router, firewall, switch, access point, or load balancer. In a further example, the device is a server. For example, the server implements a hypervisor.

In another example of the fourth aspect and the above examples, the method further includes forming a Markov model associated with the event lattice. For example, the Markov model predicts subsequent events within the event lattice. In another example, the Markov model predicts a probability of an originator associated with a behavior pattern harming the computing assets.

In a fifth aspect, a method for protecting computing assets includes detecting a set of events associated with an originator using a set of event sensors; comparing, using an inference server in communication with the set of event sensors, the detected set of events to an event lattice; determining a pattern of behavior indicative of an attack on the computing assets based on the comparing; and communicating, using the inference server, an identifier associated with the originator.

In an example of the fifth aspect, the pattern of behavior is represented by a node of the event lattice. For example, the method further includes determining a risk associated with the node. In an example, the risk is determined based on a number of steps to a node representing a breach in cyber security. For example, the risk is determined based on a percentage of nodes in the lattice below the node that represent a breach in cyber security.

In another example of the fifth aspect and the above examples, communicating includes communicating with a cyber security server.

In a further example of the fifth aspect and the above examples, communicating include communicating with another inference server.

In an additional example of the fifth aspect and the above examples, the method further includes detecting a second set of events associated with the originator using a second set of event sensors. For example, the method further includes comparing the second set of events to the event lattice using a second inference server; and determining a further pattern of behavior indicative of the attack on the computing assets based on the comparing and the pattern detected by the inference server. In an example, the method further includes communicating the identifier to a cyber security server with the second inference server.

In a sixth aspect, a method for protecting computing assets includes identifying a pattern of behaviors associated with an originator and indicative of an attack on the computing assets using a first inference server and a first portion of an event lattice; communicating an identifier associated with the originator from the first inference server to a second inference server; and identifying a second pattern of behaviors associated with the originator and further indicative of the attack on the computing assets using a second portion of the event lattice.

In a seventh aspect, a cyber security system includes a plurality of event sensors to detect events; a plurality of inference servers, each inference server of the plurality in communication with a subset of event sensors of the plurality of event sensors, the each inference server having a portion of an event lattice and to compare the event detected by the subset of event sensors to the event lattice, the each inference server to identify an originator having a behavior pattern indicative of an attack and communicating an identifier associated with the originator; a server in communication with the plurality of inference servers, the server to provide an interface indicating the behavior pattern indicative of an attack and the identifier of the originator.

In an eighth aspect, a method for detecting a threat to security of computing assets includes detecting, using a set of event sensors, a set of events associated with an originator; comparing, using an inference server, the set of network events to an event lattice; determining a risk level associated with the set of network events in response to the comparing; and communicating the risk level and an identifier associated with the originator to a cyber security server.

In a ninth aspect, a method of protecting a network includes generating an event lattice using formal concept analysis applied to annotated network event data, the event lattice including a plurality of nodes associated with different events, a set of the nodes indicating a behavior adverse to cyber security; dividing the event lattice into a plurality of lattice portions; and assigning each of the plurality of lattice portions to inference servers, each inference server in communication with a set of event sensors operable to detect events of the assigned lattice portion.

In a tenth aspect, a cyber security system includes an attribute extractor to extract an event from a data resource, the event including an identifier associated with an originator and including an attribute; an attribute router in communication with the attribute extractor; an inference engine in communication with the attribute router and having an associated lattice, the lattice to receive the attribute and to generate a predictive event, the attribute router to route the event to the inference engine; and a monitoring server in communication with the inference engine, the inference engine to provide the predictive event to the monitoring server.

In an example of the tenth aspect, the predictive event includes the identifier associated with the originator, a set of attributes including the attribute, an identity of the lattice, and a reached node within the lattice. For example, the predictive event further includes a session identifier and a progress.

In another example of the tenth aspect and the above examples, the system further comprises a progress forwarded to receive the predictive event from the inference engine and to provide the predictive event to the monitoring server.

In a further example of the tenth aspect and the above examples, the inference engine includes a queue and inference threads.

In an additional example of the tenth aspect and the above examples, the inference engine includes the lattice and a lattice start attribute, the inference engine to start a new session when an attribute associated with the lattice start attribute is received.

In another example of the tenth aspect and the above examples, the inference engine further includes an output forwarder in communication with a prediction forwarder.

In a further example of the tenth aspect and the above examples, the system further includes a deployment database. For example, the deployment database includes an attribute:lattice database, the attribute router to select the inference engine at least in part based on the attribute:lattice database. In another example, the deployment database includes a lattice: lattice address database, the attribute router to select the inference engine at least in part based on the lattice: lattice address database. In a further example, the deployment database includes a lattice database.

In an eleventh aspect, a method for monitoring a computing environment includes detecting an event with an attribute extractor, the event associating an attribute with an identifier associated with an originator; routing the event to an inference engine of a plurality of inference engines using an attribute router in communication with the attribute extractor, the attribute router selecting the inference engine based at least in part on the attribute and a lattice associated with the inference engine; determining a predictive event with the inference engine, the predictive event including the identifier associated with the originator, a set of attributes including the attribute, an identity of the lattice, and a reached node; and forwarding the predictive event to a monitoring server.

In an example of the eleventh aspect, a prediction forwarder receives the predictive event from the inference engine and forwards the predictive event to the monitoring server.

In another example of the eleventh aspect and the above examples, the predictive event further includes a session identification.

In a further example of the eleventh aspect and the above examples, the predictive event further includes an indication of progress.

In an additional example of the eleventh aspect and the above examples, the method further includes determining with the inference engine whether the attribute matches a lattice start attribute; and starting a new session in response to the attribute matching the lattice start attribute.

In another example of the eleventh aspect and the above examples, the method further includes determining with the inference engine a lattice position. For example, the method further includes determining whether the lattice position is at a bottom position within the lattice and deleting the session when the lattice position is at the bottom.

In a twelfth aspect, a method for protecting computing assets includes detecting a set of events associated with an originator using a set of event sensors; comparing, using an inference server in communication with the set of event sensors, the detected set of events to a detection model derived from Sequence Learning; determining a pattern of behavior indicative of an attack on the computing assets based on the comparing; and communicating, using the inference server, an identifier associated with the originator.

In an example of the twelfth aspect, Sequence Learning includes Deep Learning. For example, Deep Learning includes a Recurrent Neural Network. In a further example, Deep Learning includes natural language learning.

In another example of the twelfth aspect and the above examples, the detection model includes an event lattice. For example, Sequence Learning includes Association Rule Learning. In another example, Association Rule Learning includes Formal Concept Analysis. In a further example, Association Rule Learning includes Frequent Item Sets. In an additional example, Association Rule Learning includes Triadic Concept Analysis.

In a further example of the twelfth aspect and the above examples, the event lattice includes a set of nodes, a node of the set of nodes indicative of the attack on the computing assets. For example, the method further includes when communicating the identifier, communicating the node. In an example, a risk associated with the node is determined based on a number of steps to a node representing a breach of cyber security. In another example, a risk associated with the node is determined based on a percentage of nodes representing a breach of cyber security are in the lattice below the node.

In an additional example of the twelfth aspect and the above examples, determining the pattern of behavior includes determining a node of the event lattice correlated with the set of events. For example, the method further includes detecting a second set of events associated with the originator using a second set of event sensors. In a further example, the method further includes comparing the second set of events to the event lattice using a second inference server; and determining a further pattern of behavior indicative of the attack on the computing assets based on the comparing and the pattern detected by the inference server. For example, the method further includes communicating the identifier to a cyber security server with the second inference server.

In another example of the twelfth aspect and the above examples, communicating includes communicating with a cyber security server.

In a further example of the twelfth aspect and the above examples, communicating include communicating with another inference server.

In an additional example of the twelfth aspect and the above examples, an event of the set of events includes a detected signature in a network packet.

In another example of the twelfth aspect and the above examples, an event of the set of network events includes a memory usage pattern.

In a further example of the twelfth aspect and the above examples, an event of the set of events includes a central processing unit usage pattern.

In an additional example of the twelfth aspect and the above examples, an event of the set of events includes an application access.

In a thirteenth aspect, a cyber security system includes a plurality of event sensors to detect events; a plurality of inference servers, each inference server of the plurality in communication with a subset of event sensors of the plurality of event sensors, the each inference server having an event model and to compare an event detected by the subset of event sensors to the event model, the each inference server to identify an originator having a behavior pattern indicative of an attack and communicating an identifier associated with the originator, wherein the event model is a Sequence Learning model; and a server in communication with the plurality of inference servers, the server to provide an interface indicating the behavior pattern indicative of a network attack and the identifier of the originator.

In an example of the thirteenth aspect, the event model of the each inference server is different from the event model of another inference server of the plurality of inference servers.

In another example of the thirteenth aspect and the above examples, Sequence Learning includes Deep Learning. For example, Deep Learning includes a Recurrent Neural Network. In an example, Deep Learning includes natural language learning.

In a further example of the thirteenth aspect and the above examples, the event model includes an event lattice, the event lattice includes a set of event nodes and a set of nodes linked to event nodes of the set of event nodes, each node having a node position. For example, the behavior pattern of the originator is indicated by the node position. In an example, the method further includes an event router to direct the detected events to an inference server of the plurality of inference servers based on the event lattice implemented by the inference server. In an example, the event lattice is derived using Association Rule Learning. For example, Association Rule Learning includes Formal Concept Analysis. In another example, Association Rule Learning includes Frequent Item Sets. In a further example, Association Rule Learning includes Triadic Concept Analysis.

In additional example of the thirteenth aspect and the above examples, an event sensor of the plurality of event sensors is to detect events comprising a signature in a network packet.

In another example of the thirteenth aspect and the above examples, an event sensor of the plurality of event sensors is to detect events comprising memory usage patterns.

In a further example of the thirteenth aspect and the above examples, an event sensor of the plurality of event sensors is to detect events comprising central processing unit usage patterns.

In an additional example of the thirteenth aspect and the above examples, an event sensor of the plurality of event sensors is to detect network event comprising an application access.

In a fourteenth aspect, a method for protecting computing assets includes detecting a set of events in a networked computing environment using a set of event sensors distributed in the networked computing environment; determining a risk factor by applying the set of events to a sequence learning detection model using an inference server in communication with the set of event sensors; and communicating the risk factor to an insurance server.

In an example of the fourteenth aspect, the method further comprising determining an insurance premium based at least in part on the risk factor. In another example, the determining the insurance premium is performed dynamically.

In another example of the fourteenth aspect and the above examples, the method further includes detecting a loss risk event by applying the set of events to a detection model. In an example, the method further includes communicating the loss risk event to the insurance server. In another example, the method further includes implementing loss mitigation protocols in response to communicating the loss risk event.

In a further example of the fourteenth aspect and the above examples, the sequence learning detection model includes an event lattice. In an example, the event lattice is derived using Association Rule Learning. For example, Association Rule Learning includes Formal Concept Analysis. In another example, Association Rule Learning includes Frequent Item Sets. In a further example, Association Rule Learning includes Triadic Concept Analysis. In an additional example, the event lattice includes a set of nodes, a node of the set of nodes indicative of the attack on the computing assets. For example, the risk factor is determined based on a number of steps from the node to a node representing a breach of cyber security. In another example, a risk factor is determined based on a percentage of nodes representing a breach of cyber security in the lattice below the node. In a further example, determining the risk factor includes determining a node of the event lattice correlated with the set of events.

In an additional example, the method further includes detecting a second set of events using a second set of event sensors. In a further example, the method further includes comparing the second set of events to the event lattice using a second inference server; and determining, by the inference server, a second risk factor based on the comparing and based on the risk factor.

In another example of the fourteenth aspect and the above examples, an event of the set of events includes a detected signature in a network packet.

In a further example of the fourteenth aspect and the above examples, wherein an event of the set of network events includes a memory usage pattern.

In an additional example of the fourteenth aspect and the above examples, an event of the set of events includes a central processing unit usage pattern.

In another example of the fourteenth aspect and the above examples, an event of the set of events includes an application access.

In a fifteenth aspect, a cyber security system includes a plurality of event sensors to detect events and a plurality of inference servers. Each inference server of the plurality is in communication with a subset of event sensors of the plurality of event sensors, The each inference server has an event lattice and is to compare an event detected by the subset of event sensors to the event lattice. The each inference is to assess a risk factor and communicate the risk factor. The cyber security system further includes a server in communication with the plurality of inference servers, the server to provide an interface indicating the risk factor and an insurance server in communication with the plurality of inference servers or the server. The plurality of inference servers of the server is to communicate the risk factor to the insurance server.

In an example of the fifteenth aspect, the insurance server is to determine an insurance premium based at least in part on the risk factor.

In another example of the fifteenth aspect and the above examples, the insurance server is to dynamically determine an insurance premium based at least in part on the risk factor.

In a further example of the fifteenth aspect and the above examples, the event lattice of the each inference server is different from the event lattice of another inference server of the plurality of inference servers.

In an additional example of the fifteenth aspect and the above examples, the event lattice includes a set of event nodes and a set of nodes linked to event nodes of the set of event nodes, each node having a node position. For example, the risk factor is partly indicated by the node position.

In another example of the fifteenth aspect and the above examples, the cyber security system further includes an event router to direct the detected events to an inference server of the plurality of inference servers based on the event lattice implemented by the inference server.

In a further example of the fifteenth aspect and the above examples, the event lattice is derived using Association Rule Learning. For example, Association Rule Learning includes Formal Concept Analysis. In another example, Association Rule Learning includes Frequent Item Sets. In a further example, Association Rule Learning includes Triadic Concept Analysis.

In an additional example of the fifteenth aspect and the above examples, an event sensor of the plurality of event sensors is to detect events comprising a signature in a network packet.

In another example of the fifteenth aspect and the above examples, an event sensor of the plurality of event sensors is to detect events comprising memory usage patterns.

In a further example of the fifteenth aspect and the above examples, wherein an event sensor of the plurality of event sensors is to detect events comprising central processing unit usage patterns.

In an additional example of the fifteenth aspect and the above examples, an event sensor of the plurality of event sensors is to detect network event comprising an application access.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A processor-implemented method for protecting computing assets, the method comprising:
   detecting a set of events in a networked computing environment using a set of event sensors distributed in the networked computing environment;
   determining a risk factor associated with a cyber security breach by applying the set of events to a sequence learning detection model using an inference server in communication with the set of event sensors, the sequence learning detection model includes an event lattice, the event lattice includes a set of event nodes and a set of nodes linked to event nodes of the set of event nodes, each node having a node position corresponding to events sensed by the event sensors; a node of the set of nodes indicating an attack on the computing assets; and
   communicating the risk factor to a data breach insurance server.

2. The method of claim 1, further comprising determining an insurance premium based at least in part on the risk factor.

3. The method of claim 2, wherein the determining the insurance premium is performed dynamically.

4. The method of claim 1, further comprising detecting a loss risk event by applying the set of events to a detection model.

5. The method of claim 4, further comprising communicating the loss risk event to the insurance server.

6. The method of claim 5, further comprising implementing loss mitigation protocols in response to communicating the loss risk event.

7. The method of claim 1, wherein the event lattice is derived using Association Rule Learning.

8. The method of claim 7, wherein Association Rule Learning includes Formal Concept Analysis.

9. The method of claim 7, wherein Association Rule Learning includes Frequent Item Sets.

10. The method of claim 7, wherein Association Rule Learning includes Triadic Concept Analysis.

11. The method of claim 1, wherein the risk factor is determined based on a number of steps from the node to a node representing a breach of cyber security.

12. The method of claim 1, wherein a risk factor is determined based on a percentage of nodes representing a breach of cyber security in the lattice below the node.

13. The method of claim 1, wherein determining the risk factor includes determining a node of the event lattice correlated with the set of events.

14. The method of claim 13, further comprising:
    detecting a second set of events using a second set of event sensors.

15. The method of claim 14, further comprising:
    comparing the second set of events to the event lattice using a second inference server; and
    determining, by the inference server, a second risk factor based on the comparing and based on the risk factor.

16. The method of claim 1, wherein an event of the set of events includes a detected signature in a network packet.

17. The method of claim 1, wherein an event of the set of network events includes a memory usage pattern.

18. The method of claim 1, wherein an event of the set of events includes a central processing unit usage pattern.

19. The method of claim 1, wherein an event of the set of events includes an application access.

20. The method of claim 1, wherein the detected set of events is represented by a node having a node position corresponding to the detected set of events.

* * * * *